United States Patent
Petranovich

(10) Patent No.: US 8,509,315 B1
(45) Date of Patent: Aug. 13, 2013

(54) MAINTAINING SYNCHRONIZATION OF COMPRESSED DATA AND ASSOCIATED METADATA

(75) Inventor: James E. Petranovich, La Jolla, CA (US)

(73) Assignee: ViaSat, Inc., Carlsbad, CA (US)

(*) Notice: Subject to any disclaimer, the term of this patent is extended or adjusted under 35 U.S.C. 154(b) by 940 days.

(21) Appl. No.: 12/565,699

(22) Filed: Sep. 23, 2009

Related U.S. Application Data

(60) Provisional application No. 61/099,487, filed on Sep. 23, 2008.

(51) Int. Cl.
*H04N 7/12* (2006.01)
(52) U.S. Cl.
USPC .............................. 375/240.28; 375/240.01
(58) Field of Classification Search
USPC ................................. 370/230–234; 375/240.1
See application file for complete search history.

(56) References Cited

U.S. PATENT DOCUMENTS

| | | | |
|---|---|---|---|
| 4,821,119 A * | 4/1989 | Gharavi | 375/240.16 |
| 6,351,733 B1 * | 2/2002 | Saunders et al. | 704/500 |
| 7,502,417 B2 * | 3/2009 | Mizoguchi | 375/240.28 |
| 2004/0057457 A1 * | 3/2004 | Ahn et al. | 370/466 |
| 2004/0086051 A1 * | 5/2004 | Mizoguchi | 375/240.28 |
| 2007/0081587 A1 * | 4/2007 | Raveendran et al. | 375/240.1 |

* cited by examiner

*Primary Examiner* — Allen Wong
(74) *Attorney, Agent, or Firm* — Kilpatrick Townsend & Stockton, LLP

(57) ABSTRACT

Synchronization of data streams is enabled. Synchronized data streams may include compressed data streams. Conventional data compression components may be utilized to generate the compressed data streams. As an example, compressed digitized video and associated metadata may be synchronized in this way. Synchronization may be enabled based on causing data compression components to generate detectable data units. For example, patterns of data units having well characterized entropies may be passed through data compression components to generate detectable patterns of compressed data units.

18 Claims, 18 Drawing Sheets

MAINTAINING SYNCHRONIZATION OF COMPRESSED DATA AND ASSOCIATED METADATA

CROSS-REFERENCES TO RELATED APPLICATIONS

This application claims the benefit of U.S. Provisional Application No. 61/099,487, filed Sep. 23, 2008.

FIELD OF THE INVENTION

This invention pertains generally to communication, and, more particularly, to digitized communication.

BACKGROUND OF THE INVENTION

It has become common to use a sensor to monitor some aspect of the physical world. For example, a video camera may be used to monitor a scene at a particular location. It is, furthermore, not uncommon for sensors to be remote from locations where interested parties review their observations. Consequently, various mechanisms have been devised to enable remote sensors to report their observations from remote locations. For example, some video cameras may transmit a stream of digitized video across a communication network to a storage location and/or to a digitized video viewer for immediate review. It is somewhat less common to use a cluster of remote sensors to simultaneously monitor the same location, and there are some difficulties associated with such multi-sensor monitoring.

Where multiple sensors are present at a location, it is generally desirable to synchronize their observations. However, at the present time, standards for such synchronization are typically inadequate and/or insufficiently tested. The result is a motley assortment of custom synchronization attempts, each with their own advantages and disadvantages.

One common shortcoming of such synchronization attempts is that they are custom. Custom solutions tend to be expensive solutions, and this is not of practical insignificance, but perhaps more significantly, custom solutions begin their lifetimes untested. Since untested systems tend to be unreliable, for example, due to designer inexperience and/or what are commonly referred to as system "bugs" by engineers, they are generally unsuitable for use in environments requiring high reliability. They may even be prohibited from environments where their potential unreliability put life and limb at risk. Even where a system as a whole is untested, use of well-tested system components may enhance reliability.

A particular area of functionality where this issue may arise is that of data compression. Many modern sensors generate large quantities of "raw" data so that, before a sensor's data is stored and/or transmitted across a communication network, it is desirable to compress the data. Again the example of a video camera serves well. However, data compression is a relatively complex area of art, and thus particularly susceptible to the problems of custom solutions. In addition, data compression may introduce artifacts into data generated by a sensor. For example, many video compression schemes are lossy. Consequently, where data compression is in use, it is desirable that artifacts introduced by the compression are well characterized. At the very least, custom data compression schemes introduce uncertainty with respect to such artifacts.

However, using a well-tested and/or conventional data compression component also has its problems. Such components may not support data stream synchronization, and may be inflexible with respect to reconfiguration to support such functionality. Such inflexibility is not insignificant. Some solution attempts using conventional data compression components go so far as to corrupt sensor data with synchronization data. For example, overwriting a portion of each frame in a digitized video data stream. Even more sophisticated techniques such as watermarking may introduce undesirable artifacts into sensor data, rendering the data unsuitable for some applications.

BRIEF SUMMARY OF THE INVENTION

Synchronization of data streams is enabled. Synchronized data streams may include compressed data streams. Conventional data compression components may be utilized to generate the compressed data streams. As an example, compressed digitized video and associated metadata may be synchronized in this way. Synchronization may be enabled based on causing data compression components to generate detectable data units. For example, patterns of data units having well characterized entropies may be passed through data compression components to generate detectable patterns of compressed data units.

This Brief Summary of the Invention is provided to introduce a selection of concepts in a simplified form that are further described below in the Detailed Description of the Invention. This Brief Summary of the Invention is not intended to identify key or essential features of the claimed subject matter, nor is it intended to be used as an aid in determining the scope of the claimed subject matter.

BRIEF DESCRIPTION OF THE DRAWINGS

Same numbers are used throughout the disclosure and figures to reference like components and features.

DETAILED DESCRIPTION OF THE INVENTION

In an embodiment of the invention, multiple data streams, including one or more compressed data streams, are synchronized. The data streams may include multiple data units. The data streams may be synchronized at the data unit level. The data streams may be synchronized to a reference clock of any suitable resolution. Suitable conventional data compression components may be used to create the compressed data streams. Suitable properties of conventional data compression component behavior may be exploited to enable synchronization of the data streams. For example, some conventional data compression components compress low entropy data units into compressed data units having a small size, and compress high entropy data units into compressed data units having a large size. In such a case, differences in compressed data unit size may be used to communicate information through the conventional data compression component. For example, a particular pattern of compressed data unit sizes may correspond to a synchronization marker.

Figure 1:
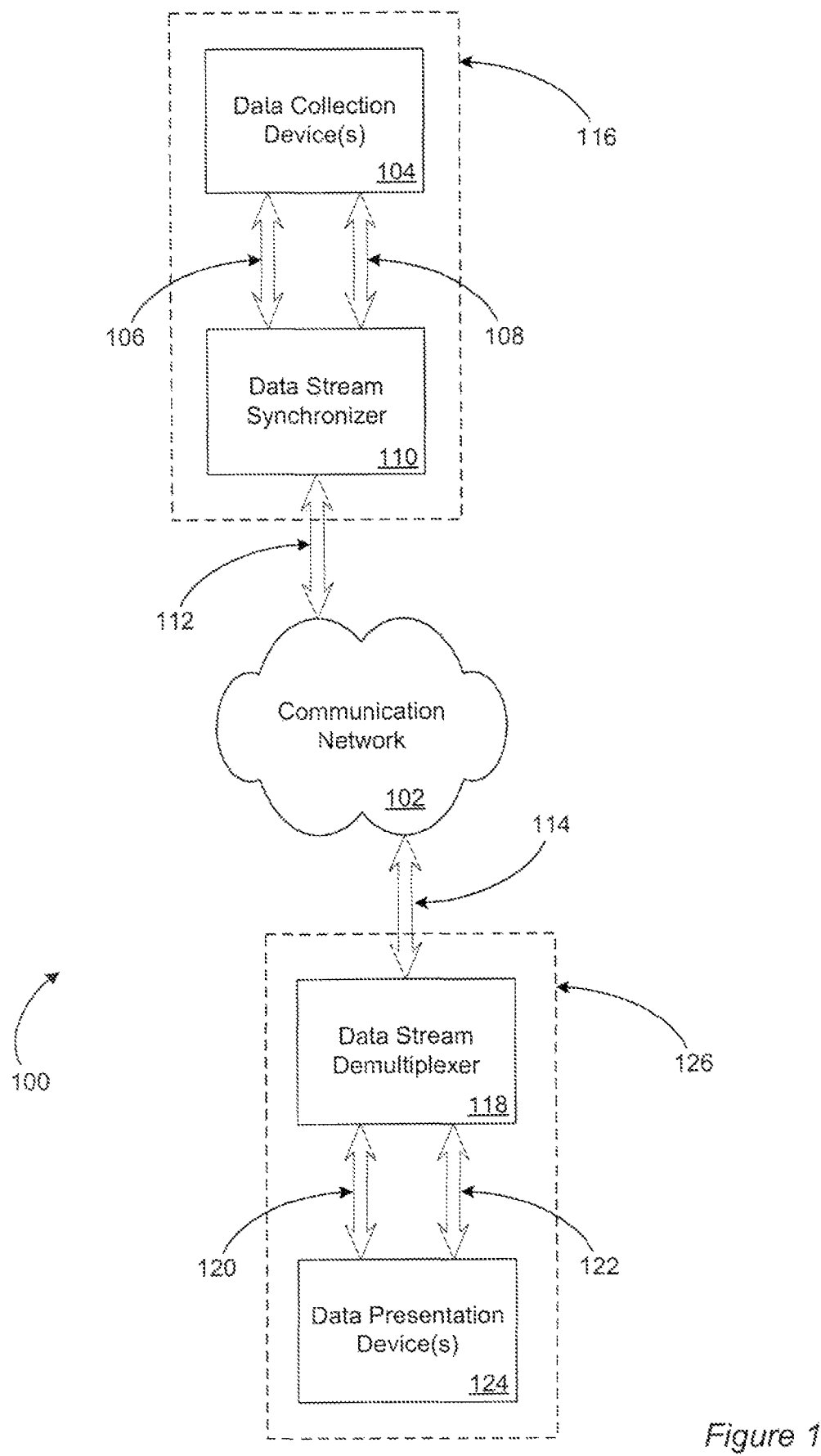
FIG. 1 is a schematic diagram depicting an example network in accordance with an embodiment of the invention.

The data streams may originate from multiple remote sensors. Synchronized data streams may be transmitted over a suitable communication network. FIG. 1 depicts an example network 100 in accordance with an embodiment of the invention. The network 100 may include a suitable communication network 102. In the network 100, one or more data collection devices 104 may generate multiple data streams 106, 108. The data streams 106, 108 may be transmitted from the data collection device(s) 104 to a data stream synchronizer 110. The data stream synchronizer 110 may synchronize the data streams 106, 108. The data stream synchronizer 110 may multiplex the data streams 106, 108 into a single multiplexed data stream 112, 114. The data collection device(s) 104 and the data stream synchronizer 110 are enclosed in a dashed line 116 to indicate that the data collection device(s) 104 and the data stream synchronizer 110 may be integrated, for example, into a single device (not shown in FIG. 1).

The data stream synchronizer 110 may transmit the multiplexed data stream 112, 114 over the communication network 102 to a data stream demultiplexer 118. The data stream demultiplexer 118 may demultiplex the multiplexed data stream 112, 114 into multiple synchronized data streams 120, 122. The network 100 may include one or more data presentation devices 124. The data presentation device(s) 124 may transform the synchronized data streams 120, 122 into a form suitable for presentation. For example, information contained in the synchronized data streams 120, 122 may be displayed on a conventional display (not shown in FIG. 1). The data stream multiplexer 118 and the data presentation device(s) 124 are enclosed in a dashed line 116 to indicate that the data stream multiplexer 118 and the data presentation device(s) 124 may be integrated, for example, into a single device (not shown in FIG. 1). Indeed, any suitable portion of the network 100 may be integrated, for example, into a single device (not shown in FIG. 1).

The data collection device(s) 104, the data stream synchronizer 110, the data stream demultiplexer 118, and the data presentation device(s) 124 may be implemented with and/or incorporate any suitable data processing device. Examples of suitable data processing devices include suitable data processing components such as electronic components and optical components, suitable data processing circuits such as electric circuits and integrated circuits (ICs), suitable data processing computers such as programmable integrated circuits, special purpose computers and computers, and suitable combinations thereof. Suitable data processing computers may include one or more processing units (e.g., CPUs) capable of executing instructions to perform tasks, as well as one or more types of computer-readable media such as volatile memory and non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language.

Examples of computer-readable media suitable for reading by data processing computers include any one or more of magnetic media (such as hard disks and flash drives), optical media such as compact disks (CDs) and communication media. Communication media may include any one or more of wired communication media such as copper wire, coaxial cable and optical fiber, as well as wireless communication media such as electro-magnetic media including radio, microwave, infra-red and laser light. In an embodiment of the invention, each computer-readable medium may be tangible. In an embodiment of the invention, each computer-readable medium may be non-transitory in time, for example, data stored in the computer-readable medium may persist for a perceptible and/or measurable amount of time.

The network 100, including the data collection device(s) 104, the data stream synchronizer 110, the data stream demultiplexer 118, the data presentation device(s) 124, and/or the communication network 102 may include any suitable network element and/or communication media. Examples of suitable network elements include modems, routers, gateways, switches, hubs, data processing devices, and suitable combinations thereof. The network 100 and/or the communication network 102 may incorporate any suitable network topology. Examples of suitable network topologies include simple point-to-point, star topology, self organizing peer-to-peer topologies, and combinations thereof. Furthermore, the network 100 and/or the communication network 102 may employ any suitable network protocol to establish and/or maintain connectivity between the data collection device(s) 104, the data stream synchronizer 110, the data stream demultiplexer 118, and/or the data presentation device(s) 124. Examples of suitable network protocols include medium access control (MAC) protocols, user datagram protocols (UDP), transmission control protocols (TCP), and internet protocols (IP), telephonic protocols, radio frequency (RF) protocols, and suitable combinations thereof.

The data collection device(s) 104 may include any suitable sensor. Examples of suitable sensors include electro-magnetic sensors such as cameras including infrared cameras, video cameras, compasses, global positioning system (GPS) receivers and radar receivers including synthetic aperture radar (SAR) receivers, acoustic sensors such as microphones and sonar receivers, thermal sensors such as thermocouples and thermometers, pressure sensors, chemical sensors such as biochemical sensors, particle detectors such as Geiger counters, as well as airspeed indicators, speedometers, accelerometers and gyroscopes. Each sensor in the data collection device(s) 104 may be a source of one or more data streams sequenced, for example, in time. The data stream(s) originating from each sensor may be digitized. Each data stream 106, 108 may incorporate one or more data streams originating from sensors in the data collection device(s) 104. The data collection device(s) 104 may further include facilities for annotating data streams originating from sensors, for example, conventional facilities for text and/or voice annotation.

The data presentation device(s) 124 may include any suitable input/output (I/O) device. Examples of suitable input/output devices include keyboards, keypads, touchpads, mice, trackballs, pens, joysticks, scanners, cameras, microphones, monitors, displays including liquid crystal displays (LCDs), touchscreens, light emitting diodes (LEDs), printers and speakers. Some input/output devices may be input-oriented and may be utilized, for example, to configure the data presentation device(s) 124 including directing and/or selecting ways in which the synchronized data streams 120, 122 are transformed and/or presented. The data presentation device(s) 124 may perform minimal processing of the synchronized data streams 120, 122 prior to presentation. Alternatively, the data presentation device(s) 124 may perform significant processing of the synchronized data streams 120, 122 prior to presentation. The data presentation device(s) 124 may perform minimal buffering of the synchronized data streams 120, 122 prior to presentation. Alternatively, the data presentation device(s) 124 may store the synchronized data streams 120, 122 for significant periods prior to presentation.

Figure 2:
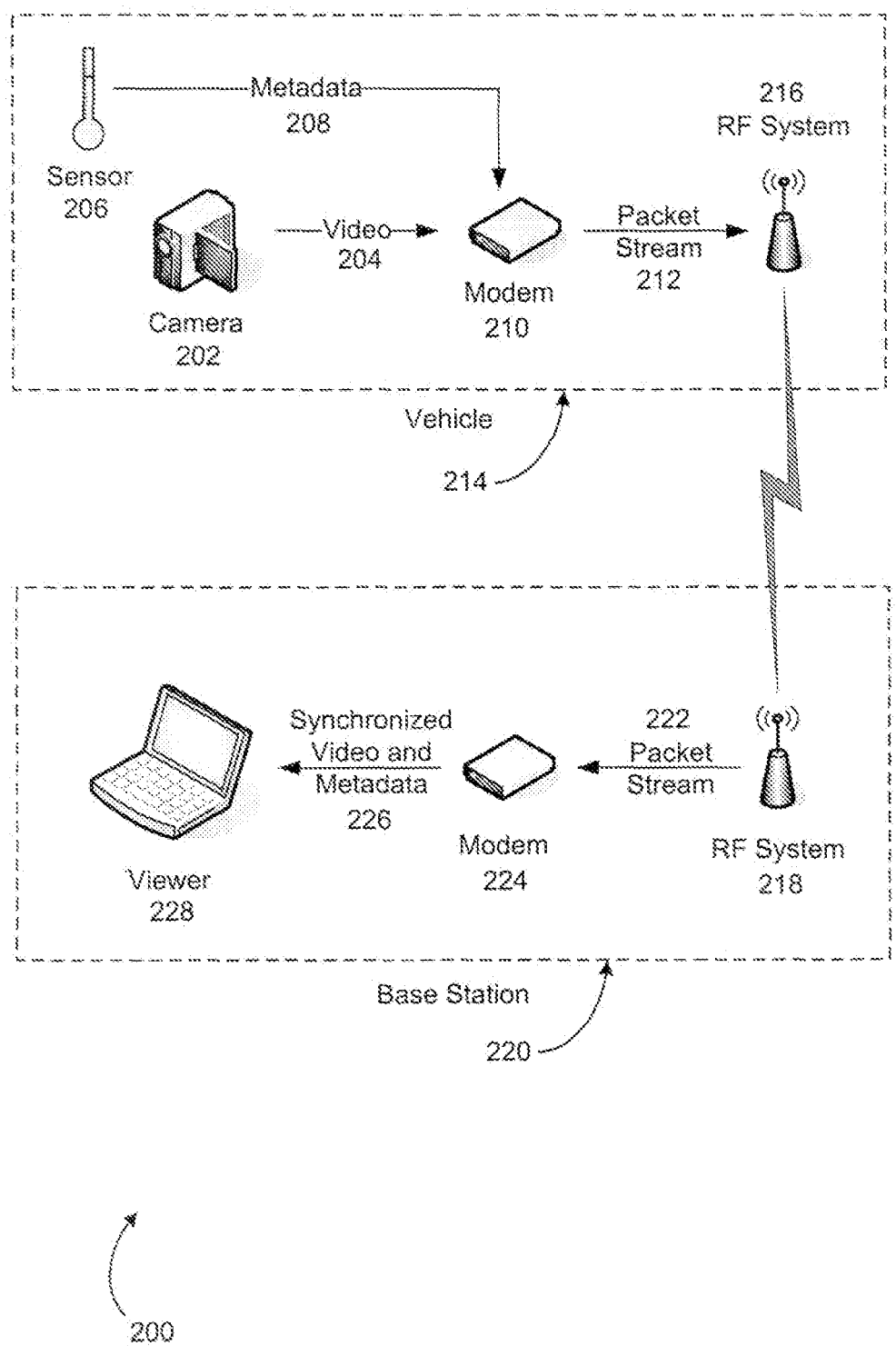
FIG. 2 is a schematic diagram depicting an example mobile configuration in accordance with an embodiment of the invention.

Aspects of the network 100 of FIG. 1 may be better understood with reference to an illustrative example. FIG. 2 depicts an example mobile configuration 200 in accordance with an embodiment of the invention. The mobile configuration 200 is an example of the network 100 of FIG. 1. In the mobile configuration 200, a video camera 202 may generate a digitized video data stream 204, and a sensor 206 may generate a metadata data stream 208. The digitized video data stream 204 and the metadata data stream 208 may be transmitted from the video camera 202 and the sensor 206 to a modem 210. The modem 210 may synchronize the digitized video data stream 204 and the metadata data stream 208. The modem 210 may multiplex digitized video data stream 204 and the metadata data stream 208 into a single multiplexed data stream 212. In the mobile configuration 200, the video camera 202, the sensor 206 and the modem 210 may be located aboard and/or integrated with a vehicle 214 such as a ground vehicle or an aircraft.

The vehicle 214 may include a radio frequency (RF) communication system 216. The vehicle 214 may utilize the RF communication system 216 to communicate with a compatible RF communication system 218 at a base station 220. The modem 210 may utilize the RF communication system 216 to send the multiplexed data stream 212 to the base station 220 where it arrives as a multiplexed data stream 222. A modem 224 at the base station 220 may then demultiplex the multiplexed data stream 222 into synchronized digitized video and metadata data streams 226. The base station 220 may include a viewer 228 for the synchronized digitized video and metadata data. The viewer 228 may transform the synchronized digitized video and metadata data streams 226 into a form suitable for viewing.

In the mobile configuration 200 example, the video camera 202 and the sensor 206 are examples of the data collection device(s) 104 of FIG. 1. The digitized video data stream 204 and the metadata data stream 208 are examples of the data streams 106, 108. The modem 210 is an example of a data processing device that implements the data stream synchronizer 110. The RF communication systems 216, 218 are an example of the communication network 102. The modem 224 is an example of a data processing device that implements the data stream demultiplexer 118. The synchronized digitized video and metadata data streams 226 are examples of the synchronized data streams 120, 122. The viewer 228 is an example of the data presentation device(s) 124.

Figure 3:
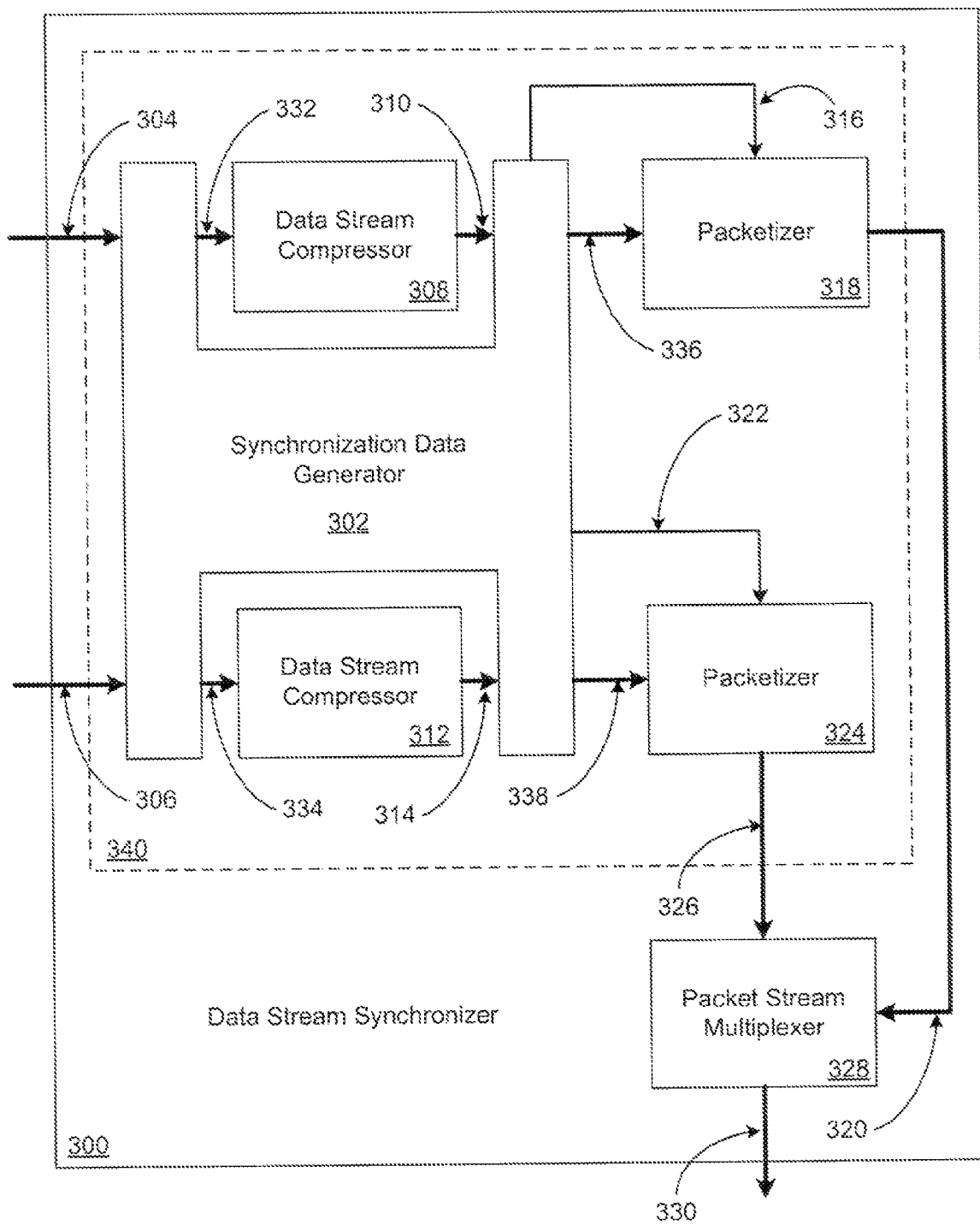
FIG. 3 is a schematic diagram depicting an example data stream synchronizer in accordance with an embodiment of the invention.

It will be helpful to describe aspects of the data stream synchronizer 110 (FIG. 1) in more detail. FIG. 3 depicts an example architecture for a data stream synchronizer 300 in accordance with an embodiment of the invention. The data stream synchronizer 300 is an example of the data stream synchronizer 110 of FIG. 1.

In the data stream synchronizer 300, a synchronization data generator 302 may receive a primary data stream 304 and a secondary (or supplementary) data stream 306. The synchronization data generator 302 may transmit the primary data stream 304 to a data stream compressor 308 for the primary data stream 304 to create a compressed data stream 310 based at least in part on the primary data stream 304. In this example, the synchronization data generator 302 also transmits the secondary data stream 306 to a data stream compressor 312 for the secondary data stream 306 to create a compressed data stream 314 based at least in part on the secondary data stream 306. However, each embodiment of the invention is not so limited. For example, in an embodiment of the invention, the secondary data stream 306 may be synchronized with the compressed data stream 310 based at least in part on the primary data stream 304 without compressing the secondary data stream 306.

The synchronization data generator 302 may generate synchronization data 316 for the compressed data stream 310 based at least in part on the primary data stream 304. The synchronization data generator 302 may transmit the compressed data stream 310 based at least in part on the primary data stream 304 and the synchronization data 316 for the compressed data stream 310 to a packetizer 318. The packetizer 318 may generate a packet stream 320 that incorporates information from the compressed data stream 310 based at least in part on the primary data stream 304 and the synchronization data 316 for the compressed data stream 310.

Similarly, the synchronization data generator 302 may generate synchronization data 322 for the compressed data stream 314 based at least in part on the secondary data stream 306. The synchronization data generator 302 may transmit the compressed data stream 314 based at least in part on the secondary data stream 306 and the synchronization data 322 for the compressed data stream 314 to a packetizer 324. The packetizer 324 may generate a packet stream 326 that incorporates information from the compressed data stream 314 based at least in part on the secondary data stream 306 and the synchronization data 322 for the compressed data stream 314.

In this example, the packetizer 318 and the packetizer 324 are shown as distinct components, however each embodiment of the invention is not so limited. For example, in an embodiment of the invention, the packetizer 318 and the packetizer 324 may be incorporated into a single packetizer (not shown in FIG. 3) capable of simultaneously generating multiple packet streams.

The packetizer 318 may transmit the packet stream 320 that incorporates information from the compressed data stream 310 and the synchronization data 316 for the compressed data stream 310 to a packet stream multiplexer 328. The packetizer 324 may similarly transmit the packet stream 326 that incorporates information from the compressed data stream 314 and the synchronization data 322 for the compressed data stream 314 to the packet stream multiplexer 328. The packet stream multiplexer 328 may multiplex the packet streams 320, 326 to generate a multiplexed packet stream 330 that incorporates information from the packet streams 320, 326.

The arrow 332 from the synchronization data generator 302 to the data stream compressor 308 indicates a data stream 332 flowing from the synchronization data generator 302 to the data stream compressor 308. The data stream 332 may be the unmodified primary data stream 304. Alternatively, the data stream 332 may be a modified version of the primary data stream 304. For example, the data stream 332 may include one or more data units overwritten by the synchronization data generator 302 and/or one or more data units injected by the synchronization data generator 302.

Similarly, the arrow 334 indicates a data stream 334 flowing from the synchronization data generator 302 to the data stream compressor 312. The data stream 334 may be the unmodified secondary data stream 306. Alternatively, the data stream 334 may be a modified version of the secondary data stream 306. For example, the data stream 334 may include one or more data units overwritten by the synchronization data generator 302 and/or one or more data units injected by the synchronization data generator 302.

The arrow 336 from the synchronization data generator 302 to the packetizer 318 indicates a data stream 336 flowing from the synchronization data generator 302 to the packetizer 318. The data stream 336 may be the unmodified compressed data stream 310 based at least in part on the primary data stream 304. Alternatively, the data stream 336 may be a modified version of the compressed data stream 310. For example, the synchronization data generator 302 may generate the data stream 336 by filtering out any data units in the compressed data stream 310 that correspond to data units in the data stream 332 that were overwritten and/or injected by the synchronization data generator 302.

Similarly, the arrow 338 indicates a data stream 338 flowing from the synchronization data generator 302 to the packetizer 324. The data stream 338 may be the unmodified compressed data stream 314 based at least in part on the secondary data stream 306. Alternatively, the data stream 338 may be a modified version of the compressed data stream 314. For example, the synchronization data generator 302 may filter out any data units in the compressed data stream 314 that correspond to data units in the data stream 334 that were overwritten and/or injected by the synchronization data generator 302.

In this example, the packet stream multiplexer 328 is shown multiplexing two packet streams 320, 326. However, each embodiment of the invention is not so limited. In an embodiment of the invention, the packet stream multiplexer 328 may multiplex any suitable number of packet streams such as the packet stream 320 and packet stream 326. The synchronization data generator 302, the data stream compressors 308, 312 and the packetizers 318, 324 are shown enclosed in a dashed line 340 to indicate that the assemblage 340 is a replicable unit 340. That is, in an embodiment of the invention, the assemblage 340 may be duplicated any suitable number of times, and the resultant packet streams multiplexed by the packet stream multiplexer 328. Furthermore the assemblage 340 may be extended to receive and process any suitable number of data streams such as the primary data stream 304 and the secondary data stream 306. In particular, the assemblage 340 may be extended to receive and process any suitable number of primary data streams such as the primary data stream 304 and any suitable number of secondary data streams such as the secondary data stream 306. In an embodiment of the invention, the assemblage 340 may be extended to receive and process the primary data stream 304 and a plurality of secondary data streams such as the secondary data stream 306. For example, the primary data stream 306 may correspond to digitized video, and the plurality of secondary data streams may include data streams corresponding to metadata, audio and control data streams.

The primary data stream 304 and the secondary data stream 306 are examples of the data streams 106, 108 of FIG. 1. With reference to FIG. 2, the digitized video data stream 204 is an example of the primary data stream 304, and the metadata data stream 208 is an example of the secondary data stream 306. The data stream compressors 308, 312 may employ data compression techniques that act on the respective data streams 304, 306 independent of a type of information contained in the data streams 304, 306. Alternatively, the data stream compressors 308, 312 may be individually tuned and/or adapted to the type of information contained in the respective data streams 304, 306. For example, the primary data stream 304 may be digitized video, and the data stream compressor 308 may be a conventional digitized video compressor, whereas the secondary data stream 306 may be digitized voice, and the data stream compressor 312 may be a specialized digitized voice compressor.

The packetizers 318, 324 may be packetizers capable of generating any suitable packet stream. For example, the packetizers 318, 324 may generate streams of user datagram protocol (UDP) packets from the data streams 336, 338 and synchronization data 316, 322 supplied by the synchronization data generator 302. In an embodiment of the invention, the packetizers 318, 324 may generate packetized elementary streams (PES), such as packetized elementary streams in accordance with a Moving Picture Experts Group (MPEG) transport stream specification. The multiplexed packet stream 330 generated by the packet stream multiplexer 328 is an example of the multiplexed data stream 112 of FIG. 1. The multiplexed data stream 212 of FIG. 2 may incorporate a multiplexed packet stream such as the multiplexed packet stream 330 generated by the packet stream multiplexer 328.

A user interface (not shown), for example a graphical user interface, may be associated with the data stream synchronizer 300. The user interface may configure some or all of the attributes and/or behaviors of the data stream synchronizer 300 in a manner well understood by those of skill in the art.

Figure 4:
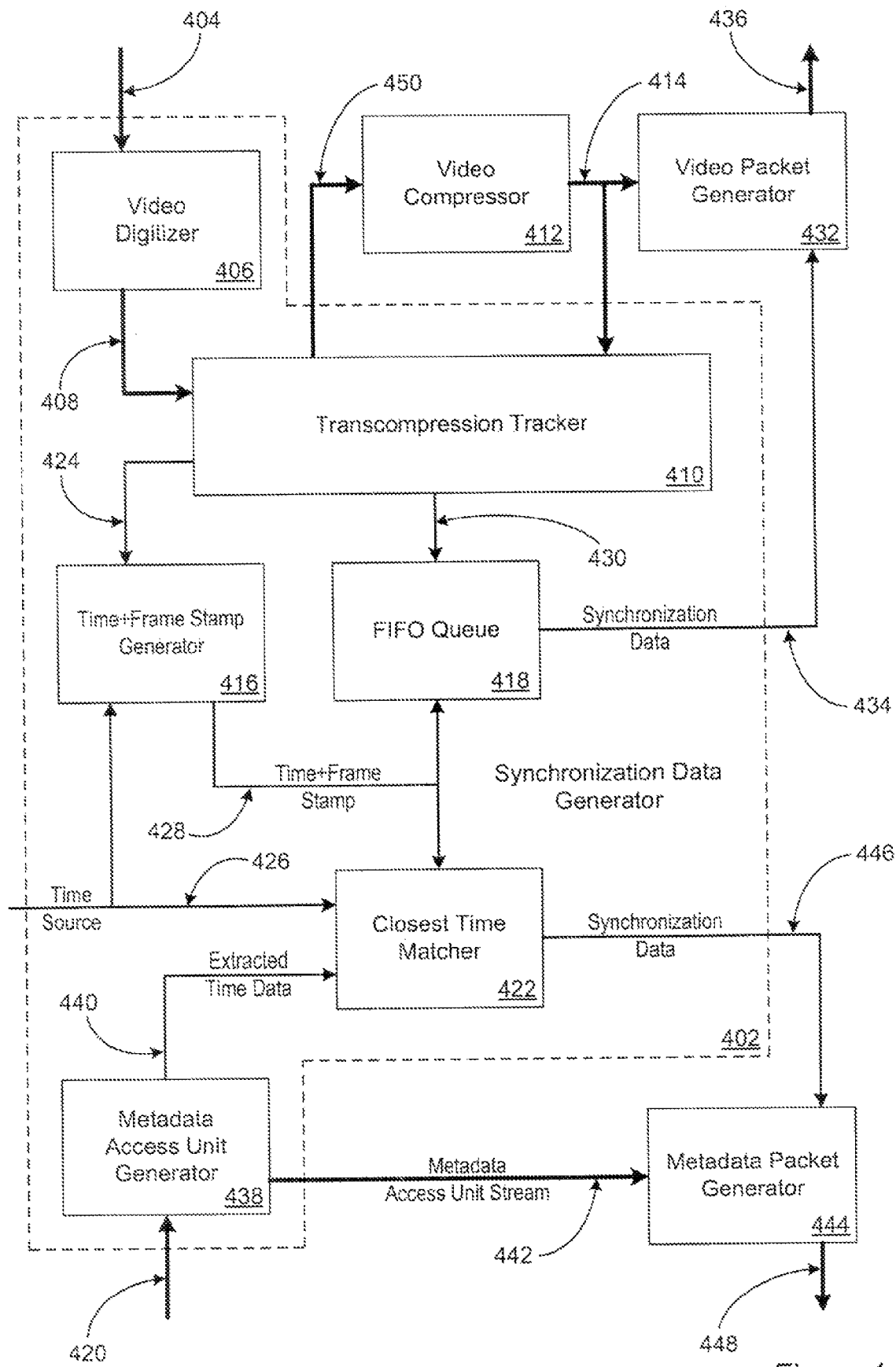
FIG. 4 is a schematic diagram depicting an example synchronization data generator in accordance with an embodiment of the invention.

It will now be helpful to describe aspects of the synchronization data generator 302 in more detail and with reference to a particular example. FIG. 4 depicts an example synchronization data generator 402 in accordance with an embodiment of the invention. The synchronization data generator 402 is an example of the synchronization data generator 302 of FIG. 3.

In this example, the synchronization data generator 402 may receive an analog video stream 404 at a video digitizer 406. The video digitizer 406 may generate a digitized video data stream 408, and transmit the digitized video data stream 408 to a transcompression tracker 410. For example, the analog video stream 404 may be digitized in accordance with one of the International Telecommunication Union Radiocommunication Sector (ITU-R) BT.656 series of standards such as ITU-R BT.656-5, "Interface for digital component video signals in 525-line and 625-line television systems operating at the 4:2:2 level of Recommendation ITU-R BT.601." Alternatively, the synchronization data generator 402 may receive the digitized video data stream 408 directly from an external source such as the video camera 202 of FIG. 2.

The transcompression tracker 410 may process the digitized video data stream 408. The transcompression tracker 410 may route the digitized video data stream 408 through a video compressor 412. The video compressor 412 may generate a compressed digitized video data stream 414. The digitized video data stream 408 may include a plurality of frames of digitized video ("digitized video frames"). The compressed digitized video data stream 414 may include a plurality of frames of compressed digitized video ("compressed digitized video frames"). The transcompression tracker 410 may match frames in the digitized video data stream 408 to frames in the compressed digitized video data stream 414. The video compressor 412 may have a variable and/or indeterminate processing latency. The transcompression tracker 410 may match a clock time associated with each frame in the digitized video data stream 408 to a corresponding frame in the compressed digitized video data stream 414, for example, with assistance from a time and frame stamp generator 416 and a first in, first out (FIFO) queue 418 as described below in detail.

Hence frames of the compressed digitized video data stream 414 may be associated with particular clock times. In an embodiment of the invention, data units of a metadata data stream 420 may be also be associated with the particular clock times. The data units of the metadata data stream 420 need not arrive at the synchronization data generator 402 at a same rate and/or clock times as the frames of the digitized video data stream 408 and/or the compressed digitized video data stream 414. However, a closest time matcher 422 may associate the data units of the metadata data stream 420 with the particular clock times associated with the frames of the compressed digitized video data stream 414. In an embodiment of the invention, association of the particular clock times with the frames of the compressed digitized video data stream 414 and the data units of the metadata data stream 420 may enable synchronization of the compressed digitized video data stream 414 and the metadata data stream 420.

The primary data stream 304 of FIG. 3 may include a plurality of data units. The digitized video data stream 408 of FIG. 4 may include a plurality of digitized video frames. For example, the digitized video data stream 408 may include a fixed number of digitized video frames per unit time such as 30 frames per second (FPS). The transcompression tracker 410 may track one or more digitized video frame statistics, and may transmit one or more of the digitized video frame statistic(s) 424 to the time and frame stamp generator 416. The digitized video frame statistic(s) tracked by the transcompression tracker 410 may include a count of digitized video frames arriving in the digitized video data stream 408. As an illustration, the transcompression tracker 410 may send information corresponding to "0001" to the time and frame stamp generator 416 when a first frame of the digitized video data stream 408 is counted by the transcompression tracker 410, then information corresponding to "0002" when a second frame of the digitized video data stream 408 is counted, and so on.

The time and frame stamp generator 416 may further receive a time source data stream 426. For example, the time source data stream may be a conventional clocking signal or synchronous pulse. The time and frame stamp generator 416 may utilize the digitized video frame statistic(s) 424 and the time source data stream 426 to generate a stream 428 of time and frame stamps. Each time and frame stamp in the stream 428 may include information corresponding to a time, such as a clock time, and to a number that corresponds to a particular frame of digitized video, such as a frame count. As an illustration, a first time and frame stamp may include information corresponding to a pair "42033, 0001" where "42033" is a number of milliseconds from a commonly agreed upon reference time and "0001" corresponds to a particular frame of digitized video, a second time and frame stamp may include information corresponding to the pair "42067, 0002", and so on. As will be apparent to one of skill in the art, an embodiment of the invention may include any suitable type of time and frame stamp. In particular, time and frame stamps in the stream 428 may have any suitable structure and/or format.

The time and frame stamp generator 416 may transmit the stream 428 of time and frame stamps to the FIFO queue 418. The FIFO queue 418 may be controlled by the transcompression tracker 410. For example, the transcompression tracker 410 may transmit synchronization messages 430, such as synchronization signals and/or synchronization data, to the FIFO queue 418. The transcompression tracker 410 may transmit one or more types of synchronization message to the FIFO queue. The one or more types of synchronization message may include frame count notifications such as notification of pre-compression frame count update and/or notification of post-compression frame count update, as well as transcompression delay notifications. As an illustration, a synchronization message may include information corresponding to "update", indicating, for example, that a new compressed digitized video frame has been counted, or to "update 0003", indicating, for example, that a compressed digitized video frame counter (not shown in FIG. 4) has been updated to a value corresponding to "0003", or to "delay+7", indicating, for example, that a difference between a pre-compression frame count and a post-compression frame count has a value corresponding to "+7".

The transcompression tracker 410 may transmit the digitized video data stream 408 to the video compressor 412. The video compressor 412 is an example of the data stream compressor 308 of FIG. 3. The video compressor 412 may generate the compressed digitized video data stream 414. For example, the digitized video data stream 408 may be compressed in accordance with a Moving Picture Experts Group (MPEG) standard such as ISO/IEC 13818-2:2000, "Information technology—Generic coding of moving pictures and associated audio information: Video." The plurality of compressed digitized video frames in the compressed digitized video data stream 414 may correspond to the plurality of digitized video frames in the digitized video data stream 408. There may be a one to one correspondence between compressed digitized video frames in the compressed digitized video data stream 414 and digitized video frames in the digitized video data stream 408. The transcompression tracker 410 may track one or more compressed digitized video frame statistics. The compressed digitized video frame statistic(s) tracked by the transcompression tracker 410 may include a count of compressed digitized video frames in the compressed digitized video data stream 414.

The video compressor 412 may take a variable amount of time to compress each digitized video frame in the digitized video data stream 408. The transcompression tracker 410 may track the amount of time taken by the video compressor 412 to compress each digitized video frame in the digitized video data stream 408 ("the compressor latency"). For example, the transcompression tracker 410 may track the compressor latency based at least in part on the digitized video frame statistic(s) and/or the compressed digitized video frame statistic(s). The transcompression tracker 410 need not explicitly compute the compressor latency. For example, the transcompression tracker 410 may transmit the synchronization messages 430 based at least in part on the digitized video frame statistic(s) and/or the compressed digitized video frame statistic(s). In an embodiment of the invention, the transcompression tracker 410 may transmit the synchronization messages 430 based at least in part on a comparison of the count of digitized video frames in the digitized video data stream 408 and/or the count of compressed digitized video frames in the compressed digitized video data stream 414.

As a result of receiving one of the synchronization messages 430 from the transcompression tracker 410, the FIFO queue 418 may transmit a queued time and frame stamp to a video packet generator 432 as synchronization data 434 the video packet generator 432 is an example of the packetizer 318 of FIG. 3. The video packet generator 432 may receive compressed digitized video frames in the compressed digitized video data stream 414 as well as the time and frame stamps in the synchronization data 434. The compressed digitized video frames in the compressed digitized video data stream 414 may correspond to the time and frame stamps in the synchronization data 434. The compressed digitized video frames in the compressed digitized video data stream 414 may correspond one to one with the time and frame stamps in the synchronization data 434. The video packet generator 432 may match compressed digitized video frames in the compressed digitized video data stream 414 to corresponding time and frame stamps in the synchronization data 434. For example, the video packet generator 432 may match compressed digitized video frames to corresponding time and frame stamps based at least in part on order of arrival of the compressed digitized video frames and/or order of arrival of the time and frame stamps.

The video packet generator 432 may generate a synchronized video packet stream 436. The synchronized video packet stream 436 may incorporate information from the compressed digitized video data stream 414 and the synchronization data 434. The synchronized video packet stream 436 may include a plurality of synchronized video packets. The synchronized video packets of the synchronized video packet stream 436 may correspond to the compressed digitized video frames in the compressed digitized video data stream 414. The synchronized video packets of the synchronized video packet stream 436 may correspond one to one with the compressed digitized video frames. The synchronized video packets may correspond to the time and frame stamps in the synchronization data 434. The synchronized video packets may correspond one to one with the time and frame stamps. The synchronized video packets may correspond to matching digitized video frames and time and frame stamps. The synchronized video packets may correspond one to one with matching digitized video frames and time and frame stamps.

The synchronization data generator 402 may further receive the metadata data stream 420 at a metadata access unit generator 438. The metadata data stream 420 may include a plurality of metadata data units. The metadata access unit generator 438 may extract time data 440 from the metadata data stream 420. For example, each metadata data unit in the metadata data stream 420 may include a time stamp, and the metadata access unit generator 438 may extract the time stamps from the metadata data units as the extracted time data 440. Alternatively, or in addition, the metadata access unit generator 438 may generate a time stamp for each metadata data unit, for example, utilizing the time source data stream 426 (which is not shown as being connected to the metadata access unit generator 438 in FIG. 4). As an illustration, a particular time stamp in the extracted time data 440 may include information corresponding to "42053" indicating, for example, a number of milliseconds from the commonly agreed upon reference time.

The metadata access unit generator 438 may transmit the extracted time data 440 to the closest time matcher 422. The closest time matcher 422 may further receive the stream 428 of time and frame stamps from the time and frame stamp generator 416, as well as the time source data stream 426. The digitized video frames in the digitized video data stream 408 and the metadata data units in the metadata data stream 420 may be generated at different rates. Alternatively, or in addition, their may be a latency, for example, a variable latency, between the generation of the metadata data units and the digitized video frames. In any case, the times in the time stamps in the extracted time data 440 need not match exactly the times in the stream 428 of time and frame stamps. The closest time matcher 422 may find correspondences between time stamps in the extracted time data 440 and the stream 428 of time and frame stamps. For example, the closest time matcher 422 may find a particular time and frame stamp in the stream 428 of time and frame stamps having a time most closely matching a given time stamp in the extracted time data 440. Expanding upon the illustration begun above, the particular time stamp in the extracted time data 440 including information corresponding to "42053" may be matched to the second time and frame stamp including information corresponding to the pair "42067, 0002" (14 milliseconds away) rather than to the first time and frame stamp including information corresponding to the pair "42033, 0002" (20 milliseconds distant).

Hence, the closest time matcher 422 may find a correspondence between a given metadata data unit from the metadata data stream 420 and a particular time and frame stamp from the stream 428 of time and frame stamps. Hence, the closest time matcher 422 may find a correspondence between the given metadata data unit and a particular digitized video frame from the digitized video data stream 408. Hence, the closest time matcher 422 may find a correspondence between the given metadata data unit and a particular compressed digitized video frame from the compressed digitized video data stream 414. However, each embodiment of the invention is not so limited. In particular, in an embodiment of the invention, the closest time matcher 422 may determine that there is no good match between the given time stamp in the extracted time data 440 and; for example, time and frame stamps from the stream 428 of time and frame stamps. For example, the closest time matcher 422 may determine that there is no good match between the given time stamp in the extracted time data 440 and a set of time and frame stamps from the stream 428 of time and frame stamps if none of the times associated with the time and frame stamps in the set are within a threshold distance (e.g., determined utilizing absolute difference) from a time associated with the given time stamp in the extracted time data 440.

The metadata access unit generator 438 may generate a metadata access unit stream 442 based at least in part on the metadata data stream 420. The metadata access unit stream 442 may include a plurality of metadata access units. The metadata access units of the metadata access unit stream 442 may correspond to the metadata data units of the metadata data stream 420. The metadata access units may correspond one to one with the metadata data units of the metadata data stream 420. The closest time matcher 422 may match a given metadata access unit to a particular time and frame stamp, a particular digitized video frame, and/or a particular compressed digitized video frame in a manner similar to that described above for metadata data units.

The metadata access unit generator 438 may transmit the metadata access unit stream 442 to a metadata packet generator 444. The metadata packet generator 444 is an example of the packetizer 324 of FIG. 3. For each metadata access unit in the metadata access unit stream 442, the closest time matcher 422 may transmit a matching time and frame stamp from the stream 428 of time and frame stamps to the metadata packet generator 444 as synchronization data 446. Alternatively, or in addition, the closest time matcher 422 may determine that there is no good match for one or more metadata access units in the metadata access unit stream 442. In this case, the closest time matcher 422 may transmit alternative data as synchronization data 446. For example, the alternative data for a particular metadata access unit may include the time stamp from the corresponding extracted time data 440, or a blank time stamp or a time stamp value or other indication such as a flag that indicates that the time stamp is invalid and/or not a good match to one of the time and frame stamps from the stream 428 of time and frame stamps. The metadata packet generator 444 may match time and frame stamps in the synchronization data 446 to metadata access units in the metadata access unit stream 442, for example, based at least in part on order of arrival.

The metadata packet generator 444 may generate a synchronized metadata packet stream 448. The synchronized metadata packet stream 448 may incorporate information from the metadata access unit stream 442 and the synchronization data 446. The synchronized metadata packet stream 448 may include a plurality of synchronized metadata packets. The synchronized metadata packets of the synchronized metadata packet stream 448 may correspond to the metadata access units of the metadata access unit stream 442. The synchronized metadata packets may correspond one to one with the metadata access units. The synchronized metadata packets may correspond to the time and frame stamps in the synchronization data 446. The synchronized metadata packets may correspond one to one with the time and frame stamps. The synchronized metadata packets may correspond to matching metadata data units and time and frame stamps. The synchronized metadata packets may correspond one to one with matching metadata data units and time and frame stamps.

The arrow 450 indicates a data stream 450 flowing from the transcompression tracker 410 to the video compressor 412. The data stream 450 may be the unmodified digitized video data stream 408. Alternatively, the data stream 450 may be a modified version of the digitized video data stream 408. For example, the data stream 450 may include one or more digitized video frames overwritten by the transcompression tracker 410 and/or one or more digitized video frames injected by the transcompression tracker 410. These transcompression tracker alternates are called passive or active depending on whether the data stream 450 is an unmodified or a modified version, respectively, of the digitized video data stream 408 or, more generally, of the primary and/or secondary data streams 304, 306 (FIG. 3). Details of passive and active transcompression trackers in accordance with an embodiment of the invention are described below.

Figure 5:
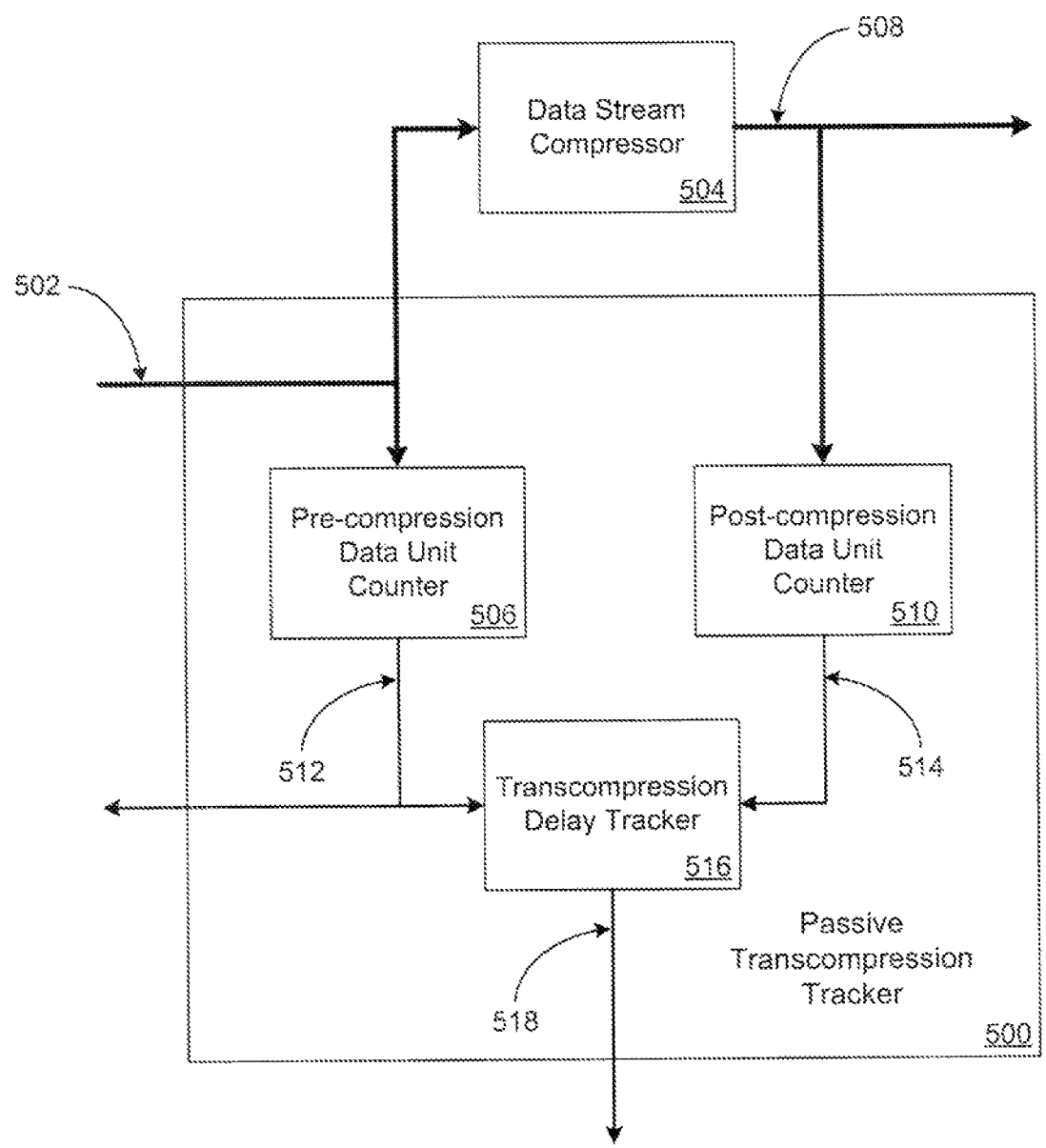
FIG. 5 is a schematic diagram depicting an example passive transcompression tracker in accordance with an embodiment of the invention.

It will be helpful to first describe a more general example of the simpler passive transcompression tracker. FIG. 5 depicts an example passive transcompression tracker 500 in accordance with an embodiment of the invention. The passive transcompression tracker 500 is an example of a transcompression tracker such as the transcompression tracker 410 of FIG. 4.

In the passive transcompression tracker 500, a compressible data stream 502 may be transmitted, unmodified, to a data stream compressor 504. For example, the compressible data stream 502 may be the primary data stream 304 of FIG. 3, and the data stream compressor 504 may be the data stream compressor 308 of FIG. 3. The compressible data stream 502 may include a plurality of data units. The compressible data stream 502 may also be transmitted to a pre-compression data unit counter 506. The pre-compression data unit counter 506 may maintain a count of the data units in the compressible data stream 502 that arrive at the passive compression tracker 500. For example, each data unit in the compressible data stream 502 may include delimiters, and the pre-compression data unit counter 506 may detect the delimiters.

The data stream compressor 504 may compress the compressible data stream 502 to generate a compressed data stream 508. The compressed data stream 508 may include a plurality of compressed data units. The compressed data stream 508 may include a compressed data unit for each data unit in the compressible data stream 502. The compressed data stream 508 may be transmitted, for example, to the packetizer 318 of FIG. 3. The compressed data stream 508 may also be transmitted to a post-compression data unit counter 510. The post-compression data unit counter 510 may maintain a count of the compressed data units in the compressed data stream 508 that arrive at the passive compression tracker 500. For example, each compressed data unit in the compressed data stream 508 may include delimiters, and the post-compression data unit counter 510 may detect the delimiters.

The pre-compression data unit counter 506 may generate data unit count messages 512 and transmit the data unit count messages 512, for example, to a data unit count stamp generator such as the time and frame stamp generator 416 of FIG. 4. In an embodiment of the invention, the data unit count messages 512 may be data unit count signals and/or data for example, conventional counting signal pulses and/or data. The post-compression data unit counter 510 may generate similar data unit count messages 514.

The pre-compression data unit counter 506 and the post-compression data unit counter 510 may transmit their data unit count messages 512, 514 to a transcompression delay tracker 516. The transcompression delay tracker 516 may utilize information contained in the data unit count messages 512, 514 to calculate a delay between the count maintained by the pre-compression data unit counter 506 and the count maintained by the post-compression data unit counter 510 ("the two counts"). For example, the transcompression delay tracker 516 may compare the two counts and/or calculate a difference between the two counts. The transcompression delay tracker 516 may generate synchronization messages 518 containing information based at least in part on the delay between the two counts. In an embodiment of the invention, the synchronization messages 518 may include an indication of the difference between the two counts. The synchronization messages 518 may be utilized to synchronize the compressed data stream 508, for example, as described above with reference to FIG. 4.

Figure 6:
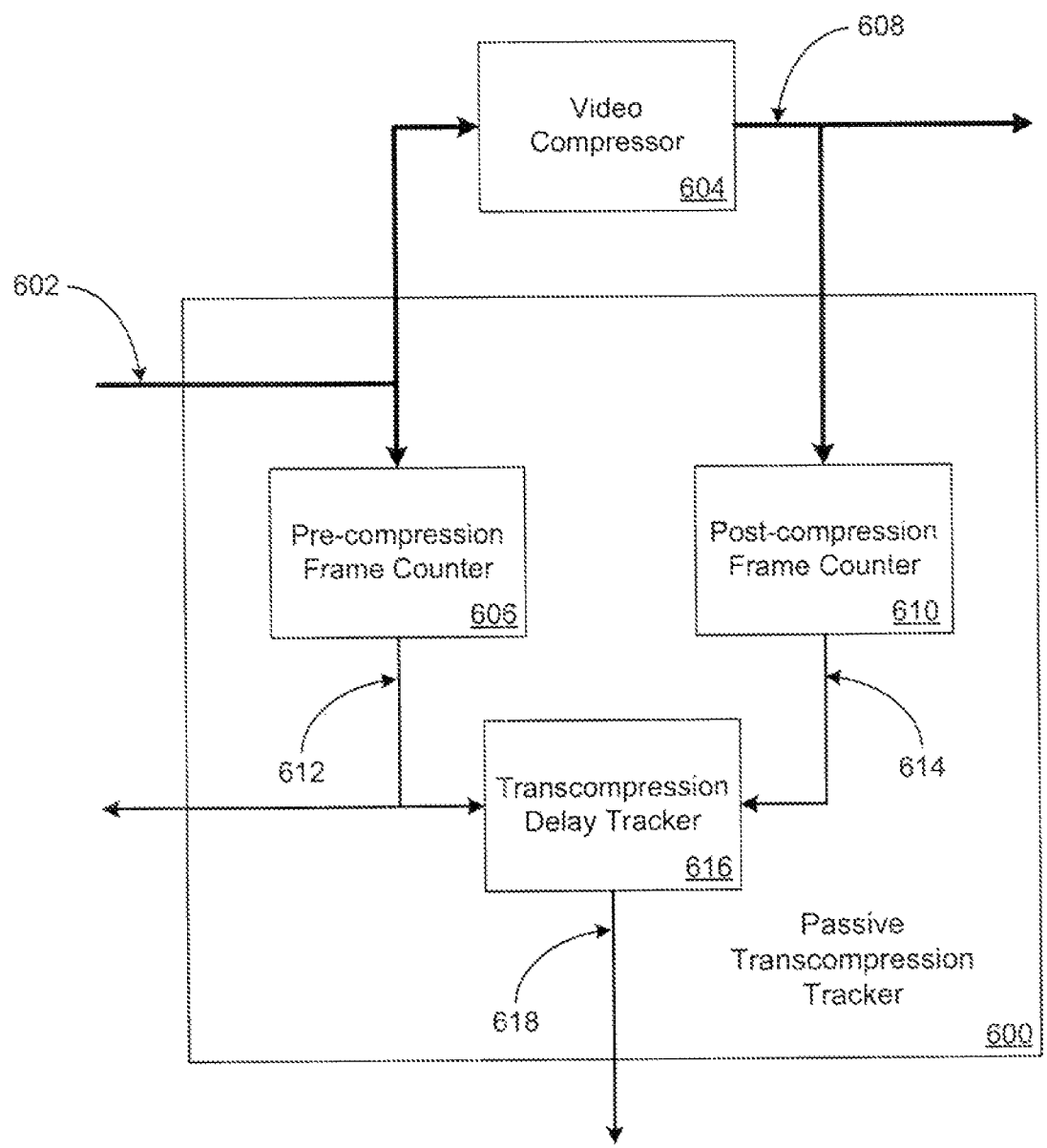
FIG. 6 is a schematic diagram depicting an example passive transcompression tracker for video in accordance with an embodiment of the invention.

It will be helpful to describe details of the passive transcompression tracker 500 in the context of the particular example described above with reference to FIG. 4. FIG. 6 depicts an example passive transcompression tracker 600 for video in accordance with an embodiment of the invention. The passive transcompression tracker 600 is an example of the transcompression tracker 410 of FIG. 4.

In the passive transcompression tracker 600, a digitized video data stream 602 may be transmitted, unmodified, to a video compressor 604. For example, the digitized video data stream 602 may be the digitized video data stream 408 of FIG. 4, and the video compressor 604 may be the video compressor 412 of FIG. 4. The digitized video data stream 602 may include a plurality of digitized video frames. The digitized video data stream 602 may also be transmitted to a pre-compression frame counter 606. The pre-compression frame counter 606 may maintain a count of the digitized video frames in the digitized video data stream 602 that arrive at the passive compression tracker 600. For example, each digitized video frame in the digitized video data stream 602 may include frame delimiters, and the pre-compression frame counter 606 may detect the frame delimiters. The pre-compression frame counter 606 is an example of the pre-compression data unit counter 506 of FIG. 5.

The video compressor 604 may compress the digitized video data stream 602 to generate a compressed digitized video data stream 608. For example, the compressed digitized video data stream 608 may be the compressed digitized video data stream 414 of FIG. 4. The compressed digitized video data stream 608 may include a plurality of compressed digitized video frames. The compressed digitized video data stream 608 may include a compressed digitized video frame for each digitized video frame in the digitized video data stream 602. The compressed digitized video data stream 608 may be transmitted to a post-compression frame counter 610. The post-compression frame counter 610 may maintain a count of the compressed digitized video frames in the compressed digitized video data stream 608 that arrive at the passive compression tracker 600. For example, each compressed digitized video frame in the compressed digitized video data stream 608 may include frame delimiters, and the post-compression data unit counter 610 may detect the frame delimiters. The post-compression frame counter 610 is an example of the post-compression data unit counter 510 of FIG. 5.

The pre-compression frame counter 606 may generate frame count messages 612 and transmit the frame count messages 612, for example, to the time and frame stamp generator 416 of FIG. 4. The post-compression frame counter 610 may generate similar frame count messages 614. The frame count messages 612, 614 are examples of the data unit count messages 512, 514 of FIG. 5, and may be processed by a transcompression delay tracker 616 as described above for the transcompression delay tracker 516. The transcompression delay tracker 616 may similarly generate synchronization messages 618. For example, the synchronization messages 618 generated by the transcompression delay tracker 616 may be the synchronization messages 430 of FIG. 4.

Figure 7:
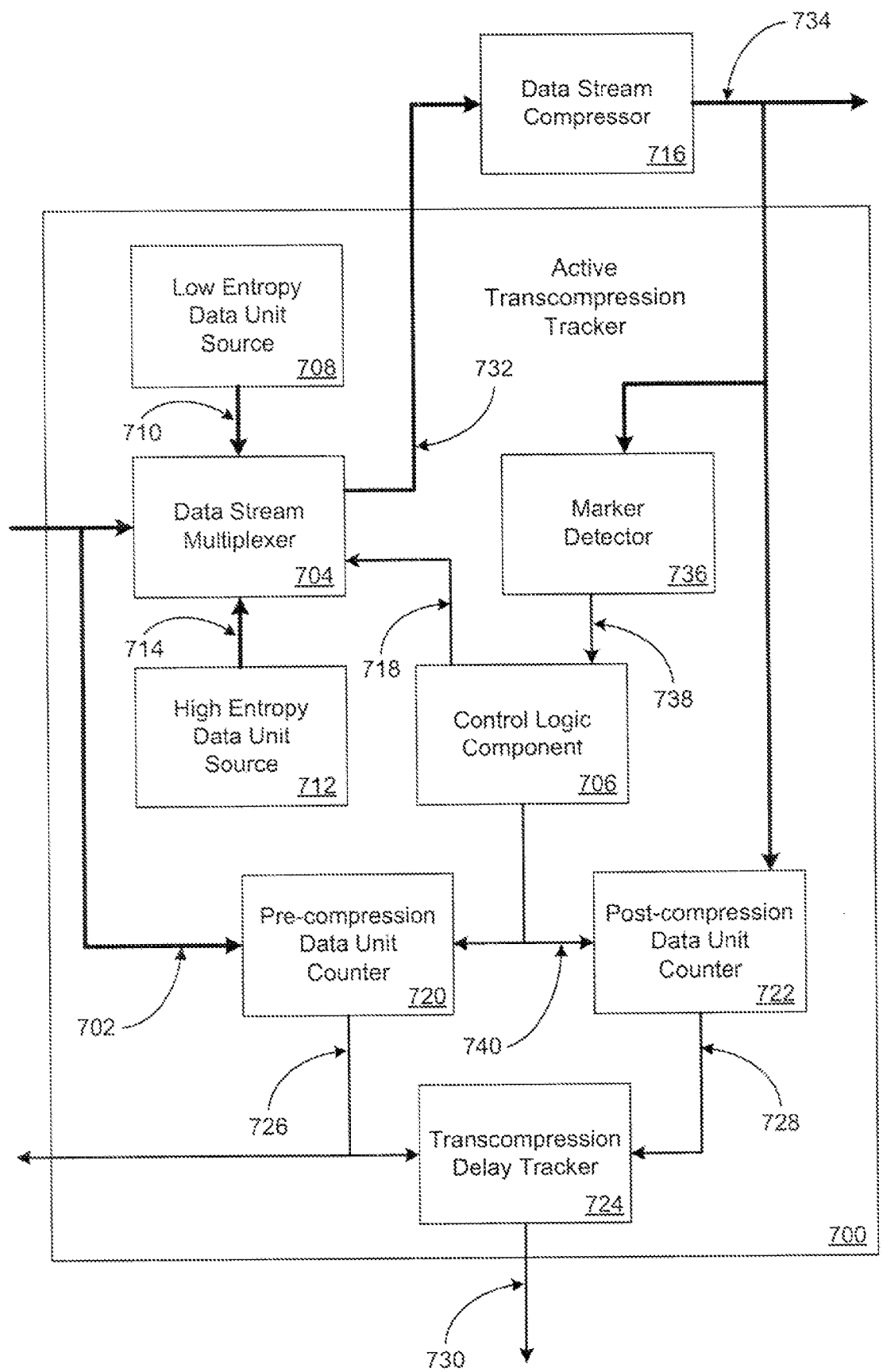
FIG. 7 is a schematic diagram depicting an example active transcompression tracker in accordance with an embodiment of the invention.

The passive transcompression tracker 500 (FIG. 5) may transmit the compressible data stream 502, unmodified, to the data stream compressor 504. However, each embodiment of the invention is not so limited. In an embodiment of the invention, a compressible data stream such as the compressible data stream 502 may be modified, for example, to enhance data stream synchronization. For example, an active transcompression tracker may modify the compressible data stream. FIG. 7 depicts an example active transcompression tracker 700 in accordance with an embodiment of the invention. The active transcompression tracker 700 is an example of a transcompression tracker such as the transcompression tracker 410 of FIG. 4.

In the active transcompression tracker 700, a compressible data stream 702 may be received by a data strewn multiplexer 704. For example, the compressible data stream 702 may be the compressible data stream 502 of FIG. 5. The active transcompression tracker 700 may include a control logic component 706. The control logic component 706 may include control logic operable to control and/or configure the data stream multiplexer 704. For example, the control logic component 706 may be a data processing device as described above with reference to FIG. 1.

The active transcompression tracker 700 may further include a low entropy data unit source 708. The low entropy data unit source 708 may transmit low entropy data units 710 to the data stream multiplexer 704. The low entropy data unit source 708 may transmit low entropy data units 710 to the data stream multiplexer 704 constantly. Alternatively, the low entropy data unit source 708 may transmit the low entropy data units 710 to the data stream multiplexer 704 on demand, for example, by the data stream multiplexer 704 and/or by the control logic module 706. Each data unit in the low entropy data units 710 may have a low entropy in the sense of information theory. For example, each data unit in the low entropy data units 710 may contain information that is uniform, near uniform, easily compressible, highly compressible and/or compressible to a compressed data unit having a small size. Each data unit in the low entropy data units 710 may be identical or similar. Alternatively, some or all of the data units in the low entropy data units 710 may differ.

The active transcompression tracker 700 may further include a high entropy data unit source 712. The high entropy data unit source 712 may transmit high entropy data units 714 to the data stream multiplexer 704. The high entropy data unit source 712 may transmit high entropy data units 714 to the data stream multiplexer 704 constantly. Alternatively, the high entropy data unit source 712 may transmit the high entropy data units 714 to the data stream multiplexer 704 on demand, for example, by the data stream multiplexer 704 and/or by the control logic module 706. Each data unit in the high entropy data units 714 may have a high entropy in the sense of information theory. For example, each data unit in the high entropy data units 714 may contain information that is highly non-uniform, difficult to compress, near incompressible and/or compressible to a compressed data unit having a large size. Each data unit in the high entropy data units 714 may be identical or similar. Alternatively, some or all of the data units in the high entropy data units 714 may differ.

The data stream multiplexer 704 may select from among a plurality of sources to transmit to a data stream compressor 716. For example, the data stream compressor 716 may be the data stream compressor 504 of FIG. 5. The plurality of sources may include the compressible data stream 702, the low entropy data units 710 and the high entropy data units 712. The control logic component 706 may transmit control messages 718, for example, control signals and/or control data, to the data stream multiplexer 704. The data stream multiplexer 704 may select from among the plurality of sources responsive to the control messages 718.

The active transcompression tracker 700 may further include a pre-compression data unit counter 720, a post-compression data unit counter 722 and a transcompression delay tracker 724. For example, each of the pre-compression data unit counter 720, the post-compression data unit counter 722 and the transcompression delay tracker 724 may have at least the attributes and behavior described above for, respectively, the pre-compression data unit counter 506, the post-compression data unit counter 510 and the transcompression delay tracker 516 of FIG. 5. Indeed, when the data stream multiplexer 704 is configured to transmit the compressible data stream 702 to the data stream compressor 716, the active transcompression tracker 700 may emulate the passive transcompression tracker 500. In particular, data unit count messages 726, 728 generated by the pre-compression data unit counter 720 and the post-compression data unit counter 722 may correspond to the data unit count messages 512, 514 described above with reference to FIG. 5, and synchronization messages 730 generated by the transcompression delay tracker 724 may correspond to the synchronization messages 518 described above with reference to FIG. 5.

In addition, the control logic component 706 may configure the data stream multiplexer 704 to transmit a pattern of data units to the data stream compressor 716. The pattern of data units may include one or more of the low entropy data units 710 and/or one or more of the high entropy data units 714. The pattern of data units may include any suitable sequence of the low entropy data units 710 and/or the high entropy data units 714. For example, the pattern of data units may include one or more of the low entropy data units 710 followed by one or more of the high entropy data units 714. In an embodiment of the invention, the pattern of data units may include a sequence of a plurality of the low entropy data units 710 followed by one of the high entropy data units 714.

Responsive to receiving compressible data units 732 transmitted by the data stream multiplexer 704, the data stream compressor 716 may generate corresponding compressed data units 734. Responsive to receiving a low entropy data unit (e.g., from the low entropy data units 710), the data stream compressor 716 may generate a corresponding compressed data unit having a small size. Responsive to receiving a high entropy data unit (e.g., from the high entropy data units 712), the data stream compressor 716 may generate a corresponding compressed data unit having a large size.

The data stream compressor 716 may transmit the compressed data units 734, for example, to the packetizer 318 of FIG. 3 and/or the post-compression data unit counter 722. In addition, the data stream compressor 716 may transmit the compressed data units 734 to a marker detector 736. The marker detector 736 may detect one or more patterns of data units in the compressed data units 734. For example, the marker detector 736 may detect a pattern of compressed data units in the compressed data units 734 corresponding to the pattern of data units transmitted to the data stream compressor 716 by the data stream multiplexer 704. When the marker detector 736 detects the pattern of compressed data units in the compressed data units 734, the marker detector 736 is said to "detect a marker." Any subset of the compressed data units in the pattern may be considered a distinguished data unit.

The marker detector 736 may classify compressed data units in the compressed data units 734. For example, each compressed data unit in the compressed data units 724 may have a size (e.g., a number of bits of information), and the marker detector 736 may classify compressed data units according to size. That is, the marker detector 736 may determine a size class for each of the compressed data units 734. The marker detector 736 may classify a particular compressed data unit according to size, for example, by comparing the size of the compressed data unit to a set of size classification thresholds. In an embodiment of the invention, the set of size classification thresholds may include a small size classification threshold, and a particular compressed data unit may be classified as a having a small size if the size of the compressed data unit is less than the small size classification threshold. Alternatively, or in addition, the set of size classification thresholds may include a large size classification threshold, and a particular compressed data unit may be classified as a having a large size if the size of the compressed data unit is greater than the large size classification threshold.

The marker detector 736 may detect the pattern of compressed data units in the compressed data units 734 based at least in part on the corresponding pattern of determined size classes. For example, the marker detector 736 may determine a marker to have been detected (i.e., detect a marker) upon determining a sequence of compressed data unit size classes that includes one or more small size classes followed by one or more large size classes. In an embodiment of the invention, the marker detector 736 may detect a marker upon determining a sequence of compressed data unit size classes that includes a plurality of small size classes followed by one large size class.

Responsive to detecting a marker, the marker detector 736 may transmit a marker detection message 738, for example, a marker detection signal and/or data, to the control logic component 706. The marker detection message 738 may indicate the particular marker that was detected by the marker detector 736. Responsive to the marker detection message 738, the control logical component 706 may transmit a counter adjust message 740, for example, a counter adjust signal and/or data, to the pre-compression data unit counter 720 and/or the post-compression data unit counter 722. Responsive to the counter adjust message 740, the pre-compression data unit counter 720 and/or the post-compression data unit counter 722 may be adjusted. For example, the pre-compression data unit counter 720 and/or the post-compression data unit counter 722 may be reset and/or synchronized. Alternatively, or in addition, an indication of receipt of the counter adjust message 740 may be transmitted to the transcompression delay tracker 724, for example, as an indicator of confidence in current values of the pre-compression data unit counter 720 and/or the post-compression data unit counter 722, and/or in a current transcompression delay value and/or state determined by the transcompression delay tracker 724. In an embodiment of the invention, the confidence is enhanced based at least in part on a number of compressed data units corresponding to low entropy data units in the pattern to be detected by the marker detector 736.

Figure 8:
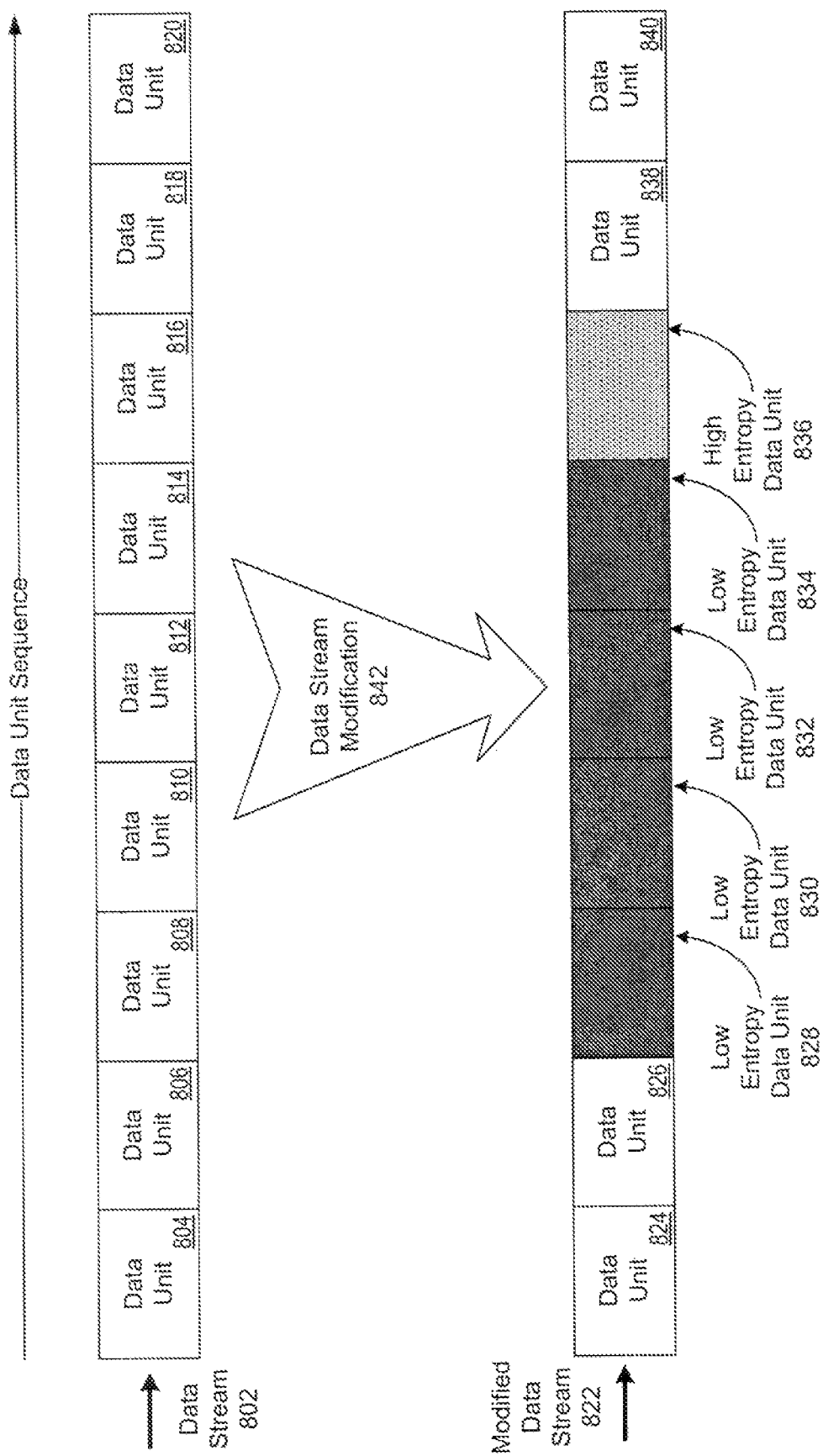
FIG. 8 is a data structure diagram depicting an example data stream modification in accordance with an embodiment of the invention.

The control logic component 706 may control and/or configure the data stream multiplexer 704, for example, to control and/or configure the stream of compressible data units 732 transmitted to the data stream compressor 716. It will be helpful to describe a transformation and/or modification of the compressible data stream 702 by the data stream multiplexer 704 and/or the control logic component 706 with reference to a depiction. FIG. 8 depicts an example data stream modification in accordance with an embodiment of the invention. For example, a data stream 802 may be the compressible data stream 702 of FIG. 7.

The data stream 802 may include a plurality of data units 804, 806, 808, 810, 812, 814, 816, 818, 820 arranged in the depicted sequence. For example, the data unit 804 may be earlier in the sequence than data unit 806 through data unit 820. The data unit 820 may be later in the sequence than data unit 804 through data unit 818. A modified data stream 822 may also include a plurality of data units 824, 826, 828, 830, 832, 834, 836, 838, 840 arranged in the depicted sequence. For example, the modified data stream 822 may be the compressible data units 732 of FIG. 7.

The data stream modification 842 of the data stream 802 to generate the modified data stream 822 may be performed as follows. The data units 824, 826 may be copies of the data units 804, 806. For example, the control logic component 706 of FIG. 7 may cause the data stream multiplexer 704 to route the compressible data stream 702 to the data stream compressor 716. The data units 828, 830, 832, 834 may be low entropy data units. For example, the control logic component 706 may cause the data stream multiplexer 704 to route the low entropy data units 710 to the data stream compressor 716. The data unit 836 may be a high entropy data unit. For example, the control logic component 706 may cause the data stream multiplexer 704 to route the high entropy data units 714 to the data stream compressor 716.

The data units 838, 840 may be copies of the data units 818, 820 of the data stream 802. For example, the control logic component 706 of FIG. 7 may cause the data stream multiplexer 704 to route the compressible data stream 702 to the data stream compressor 716. In this case, the data units 808, 810, 812, 814, 816 of the data stream 802 may be lost while the data stream multiplexer 704 routed the low entropy data units 828, 830, 832, 834 and the high entropy data unit 836. In this case, the data stream modification 842 may be considered to have overwritten the data units 808, 810, 812, 814, 816 of the data stream 802. However, each embodiment of the invention is not so limited.

Alternatively, the data units 838, 840 may be copies of the data units 808, 810. For example, the data stream multiplexer 704 of FIG. 7 may buffer the data stream 802 while the low entropy data units 828, 830, 832, 834 and the high entropy data unit 836 are being routed to the modified data stream 822. In this case, the data stream modification 842 may be considered to have injected the data units 828, 830, 832, 834, 836 into the data stream 802.

As depicted, the modified data stream 822 may include at least three distinct portions. A first portion prior to a modification may include data units 824 and 826. A second portion that includes the modification may include data units 828, 830, 832, 834 and 836. A third portion following the modification may include data units 838 and 840. Although the first, second and third portions of the modified data stream 822 are depicted in FIG. 8 as including a particular numbers of data units (two, five and two, respectively), the particular numbers are intended to be illustrative and/or representative. In an embodiment of the invention, the first, second and third portions of the modified data stream 822 may include any suitable number of data units.

As depicted in FIG. 8, the second portion of the modified data stream 822 may include a particular pattern of data units. The depicted pattern of data units is a plurality of low entropy data units 828, 830, 832, 834 followed by a high entropy data unit 836. However, each embodiment of the invention is not so limited. The second portion of the modified data stream 822 may include any suitable pattern of data units. In particular, the second portion of the modified data stream 822 may include any suitable number, including zero, of low entropy data units and/or any suitable number, including zero, of high entropy data units. Furthermore, the second portion of the modified data stream 822 may include any suitable sequence of low entropy data units and/or high entropy data units. In an embodiment of the invention, the second portion of the modified data stream 822 includes a sufficient plurality of low entropy data units 828, 830, 832, 834 (e.g., at least three low entropy data units) to put the data stream compressor 716 of FIG. 7 in a known state (e.g., to flush and/or reset the data stream compressor 716).

Figure 9:
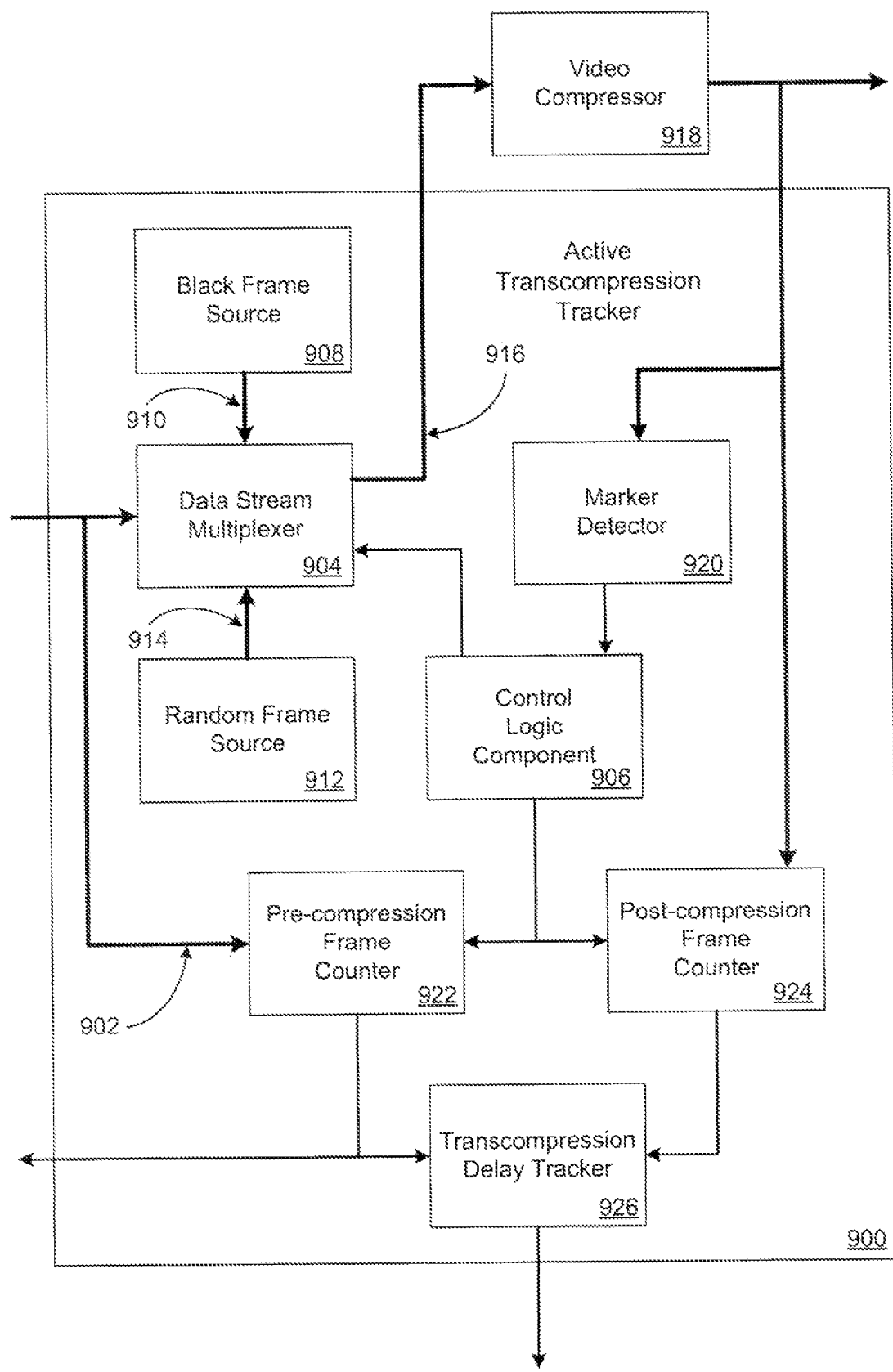
FIG. 9 is a schematic diagram depicting an example active transcompression tracker for video in accordance with an embodiment of the invention.

It will be helpful to describe details of the active transcompression tracker 700 for the more specific example of digitized video. FIG. 9 depicts an example active transcompression tracker 900 for video in accordance with an embodiment of the invention. The active transcompression tracker 900 is an example of the active transcompression tracker 700 of FIG. 7.

In the active transcompression tracker 900, a digitized video data stream 902 may be received by a data stream multiplexer 904. For example, the digitized video data stream 902 may be the digitized video data stream 602 of FIG. 6, and the data stream multiplexer 904 may be the data stream multiplexer 704 of FIG. 7. The active transcompression tracker 900 may further include a control logic component 906. For example, the control logic component 906 may have similar attributes and/or behavior as the control logic component 706 of FIG. 7.

The active transcompression tracker 900 may include a black frame source 908. The black frame source 908 may transmit frames of digitized video 910 to the data stream multiplexer 904. The frames of digitized video 910 transmitted by the black frame source 908 may include one or more black frames of digitized video. Each black frame of digitized video may be a low entropy frame of digitized video. For example, each black frame of digitized video may be substantially of a uniform intensity and/or color. In an embodiment of the invention, each black frame of digitized video may include only pixels of a lowest intensity and of a single black color ("black pixels"). Each of the frames of digitized video 910 may be identical or similar. Alternatively, some or all of the frames of digitized video 910 may differ.

The active transcompression tracker 900 may further include a random frame source 912. The random frame source 912 may transmit frames of digitized video 914 to the data stream multiplexer 904. The frames of digitized video 914 transmitted by the random frame source 912 may include one or more randomized frames of digitized video. Each randomized frame of digitized video may be a high entropy frame of digitized video. For example, each randomized frame of digitized video may be substantially made up of pixels having a randomly and/or pseudorandomly chosen intensity and/or color ("random pixels"). In an embodiment of the invention, each randomized frame of digitized video may include only random pixels. Randomized frames of digitized video may include random pixels according to a noise spectrum. For example, the noise spectrum may be a white noise spectrum, a blue noise spectrum, a red noise spectrum, or the like. Each of the frames of digitized video 914 may have identical or similar properties. Alternatively, some or all of the frames of digitized video 910 may have different properties. In an embodiment of the invention, each of the frames of digitized video 914 may be identical.

The data stream multiplexer 904 may multiplex the digitized video data stream 902, the frames of digitized video 910 transmitted by the black frame source 908 and/or the frames of digitized video 914 transmitted by the random frame source 912. The data stream multiplexer 904 may transmit multiplexed frames of digitized video 916 to a video compressor 918. For example, the video compressor 918 may be the video compressor 604 of FIG. 6. The active transcompression tracker 900 may further include a marker detector 920, a pre-compression frame counter 922, a post-compression frame counter 924, and a transcompression delay tracker 926, each having attributes and behavior corresponding to like named components of the active transcompression tracker 700 of FIG. 7.

Figure 10:
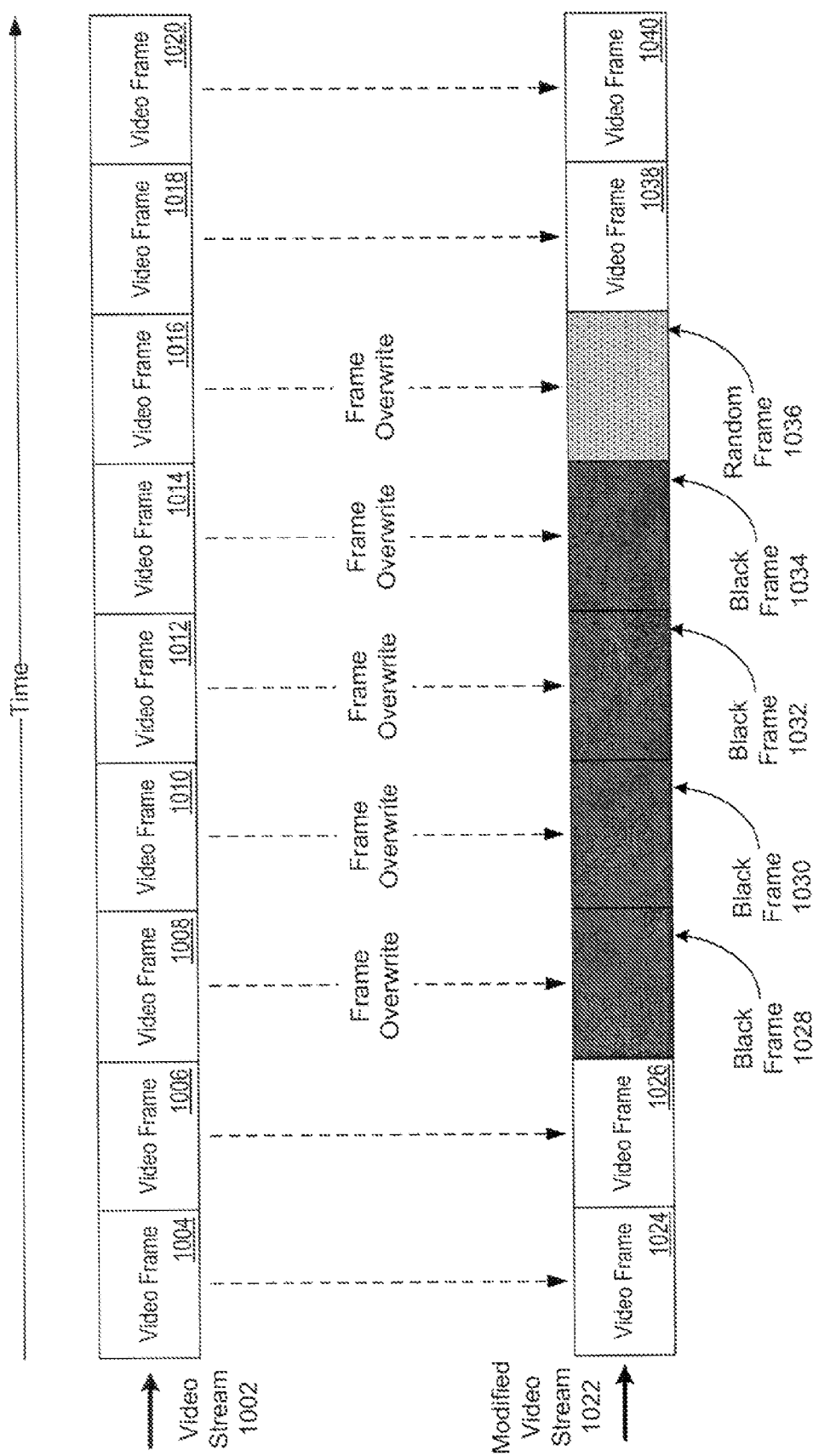
FIG. 10 is a data structure diagram depicting an example digitized video data stream modification in accordance with an embodiment of the invention.

FIG. 10 depicts an example digitized video data stream modification in accordance with an embodiment of the invention. A digitized video data stream 1002 includes a plurality of digitized video frames 1004, 1006, 1008, 1010, 1012, 1014, 1016, 1018, 1020 sequenced according to time. For example, the digitized video frame 1004 may correspond to sensor 202 (FIG. 2) data recorded earlier in time and the digitized video frame 1020 may correspond to sensor 202 data recorded later in time. Each of the plurality of digitized video frames 1004, 1006, 1008, 1010, 1012, 1014, 1016, 1018, 1020 may correspond to a period of time. In an embodiment of the invention, each of the plurality of digitized video frames 1004, 1006, 1008, 1010, 1012, 1014, 1016, 1018, 1020 may correspond to a period of time having a same magnitude, for example, depending on a frame rate of the digitized video 204. The digitized video stream data 1002 may be the digitized video stream 902 of FIG. 9.

The digitized video data stream 1002 may be modified to create a modified digitized video data stream 1022. For example, the digitized video data stream 1002 may be modified by the active transcompression tracker 900 of FIG. 9. The modified digitized video data stream 1022 may include a plurality of digitized video frames 1024, 1026, 1028, 1030, 1032, 1034, 1036, 1038, 1040 corresponding to the digitized video frames 1004, 1006, 1008, 1010, 1012, 1014, 1016, 1018, 1020 of the digitized video data stream 1002. In particular, the digitized video frames 1024, 1026, 1028, 1030, 1032, 1034, 1036, 1038, 1040 may correspond to same time periods as the digitized video frames 1004, 1006, 1008, 1010, 1012, 1014, 1016, 1018, 1020. For example, digitized video frames 1004 and 1024 may correspond to a first time period, digitized video frames 1006 and 1026 may correspond to a second time period, and so on.

The modified digitized video data stream 1022 may be considered to have portions corresponding to the portions of the modified data stream 822 of FIG. 8. For example, the digitized video frames 1024, 1026 may correspond to the first portion, the digitized video frames 1028, 1030, 1032, 1034, 1036 may correspond to the second portion, and the digitized video frames 1038, 1040 may correspond to the third portion. Furthermore, the black frames 1028, 1030, 1032, 1034 may correspond to the low entropy data units 828, 830, 832, 834, and the randomized frame 1036 may correspond to the high entropy data unit 836.

As described above with reference to FIG. 8, the second portion of the modified digitized video data stream 1022 may be understood as overwriting a corresponding portion of the digitized video stream 1002 and/or as being injected into the digitized video stream 1002. In the example digitized video data stream modification depicted in FIG. 10, the digitized video frames 1024, 1026 of the modified digitized video data stream 1022 may be the digitized video frames 1004, 1006 or copies thereof. The digitized video frames 1008, 1010, 1012, 1014 may be understood as being overwritten by the black frames 1028, 1030, 1032, 1034. The digitized video frame 1016 may be understood as being overwritten by the randomized frame 1036. Furthermore, the digitized video frames 1038, 1040 may be the digitized video frames 1018, 1020 or copies thereof.

Also as described above with reference to FIG. 8, particular numbers of digitized video frames in the portions of the modified digitized video data stream 1022 should be understood as being illustrative and/or representative. Such portions may include any suitable number of digitized video frames. In particular, the second portion of the modified digitized video data stream 1022 may include any suitable number of black frames such as the black frames 1028, 1030, 1032, 1034 and/or any suitable number of randomized frames such as the randomized frame 1036.

Figure 11:
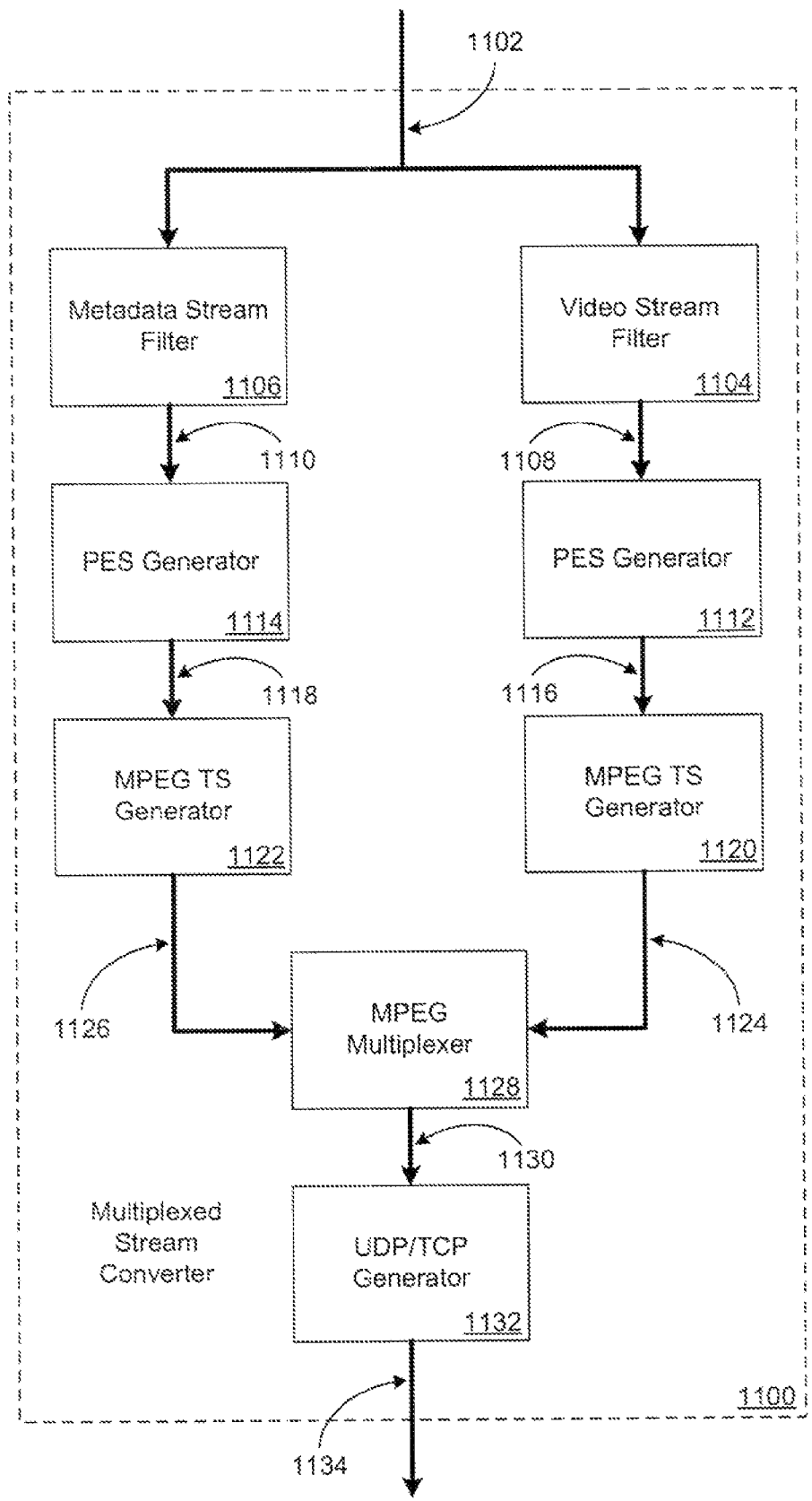
FIG. 11 is a schematic diagram depicting an example multiplexed data stream converter in accordance with an embodiment of the invention.

Hence further details of generation of the multiplexed packet stream 330 (FIG. 3) have been described. In an embodiment of the invention, the multiplexed packet stream 330 may be further processed before being transmitted across the communications network 102 (FIG. 1). For example, the multiplexed packet stream 330 may be further processed by a multiplexed data stream converter. FIG. 11 depicts an example multiplexed data stream converter 1100 in accordance with an embodiment of the invention.

In the multiplexed data stream converter 1100, a multiplexed data stream 1102, such as the multiplexed packet stream 330 of FIG. 3, may be received at a video stream filter 1104 and/or a metadata stream filter 1106. The video stream filter 1104 may filter a digitized video data stream 1108 from the multiplexed data stream 1102. For example, the digitized video data stream 1108 may be the synchronized video packet stream 436 of FIG. 4. The metadata stream filter 1106 may filter a metadata data stream 1110 from the multiplexed data stream 1102. For example, the metadata data stream 1110 may be the synchronized metadata packet stream 448.

Each of the digitized video data stream 1108 and the metadata data stream 1110 may be transmitted to corresponding packetized elementary stream (PES) generators 1112 and 1114, respectively. The PES generators 1112, 1114 may generate corresponding packetized elementary streams 1116 and 1118, respectively. The packetized elementary streams 1116, 1118 may be transmitted to corresponding MPEG transport stream (TS) generators 1120 and 1122, respectively. The MPEG TS generators 1120, 1122 may generate corresponding MPEG transport streams 1124 and 1126, respectively.

The MPEG transport streams 1124, 1126 may be transmitted to an MPEG multiplexer 1128. The MPEG multiplexer 1128 may generate a multiplexed MPEG stream 1130 based at least in part on the MPEG transport streams 1124, 1126. The multiplexed MPEG stream 1130 may be transmitted to a UDP/TCP generator 1132. The UDP/TCP generator 1132 may generate a UDP/TCP stream 1134 based at least in part on the multiplexed MPEG stream 1130. The UDP/TCP stream 1134 is an example of the multiplexed data stream 112 of FIG. 1.

Figure 12:
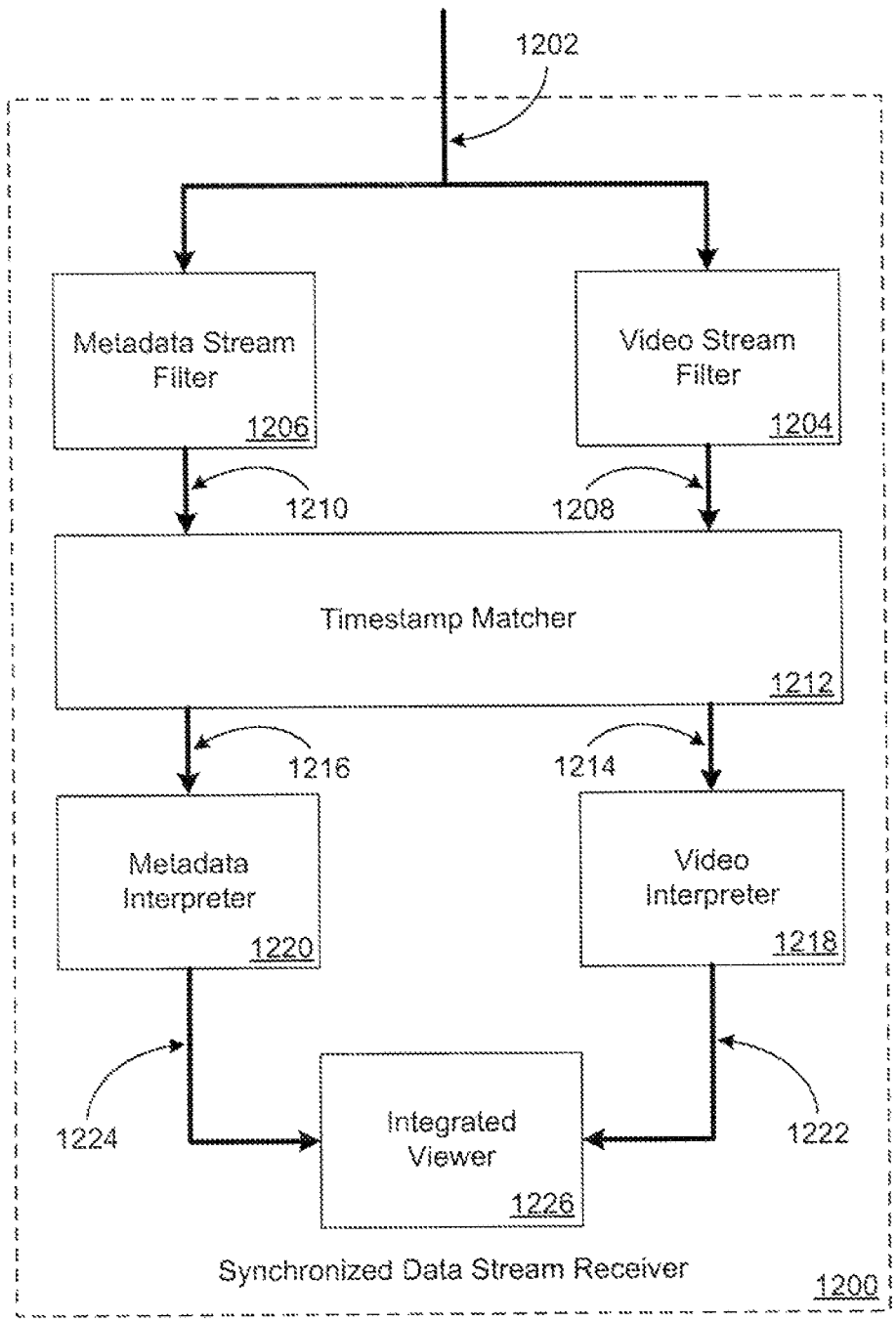
FIG. 12 is a schematic diagram depicting an example synchronized data stream receiver in accordance with an embodiment of the invention.

Once transmitted across the communications network 102 (FIG. 1), the multiplexed data stream 114 may be received, demultiplexed, further processed and/or presented to an end user such as a reviewer. FIG. 12 depicts an example synchronized data stream receiver 1200 in accordance with an embodiment of the invention. For example, the synchronized data stream receiver 1200 may implement functionality of the data stream multiplexer 118 and/or the data presentation device(s) 124 of FIG. 1.

In the synchronized data stream receiver 1200, a multiplexed data stream 1202, such as the multiplexed data stream 114 of FIG. 1, may be received at a video stream filter 1204 and/or a metadata stream filter 1206. The video stream filter 1204 may filter a synchronized video data stream 1208 from the multiplexed data stream 1202. For example, the synchronized video data stream 1208 may be the synchronized video packet stream 436 of FIG. 4. The metadata stream filter 1206 may filter a synchronized metadata data stream 1210 from the multiplexed data stream 1202. For example, the synchronized metadata data stream 1210 may be the synchronized metadata packet stream 448.

The synchronized video data stream 1208 and the synchronized metadata data stream 1210 may be transmitted to a timestamp matcher 1212. The synchronized video data stream 1208 and the synchronized metadata data stream 1210 may include the synchronization data 434, 446 generated by the synchronization data generator 402 of FIG. 4. The timestamp matcher 1212 may utilize the synchronization data 434, 446 in the synchronized data streams 1208, 1210 to synchronize data units in the synchronized data streams 1208, 1210. For example, the timestamp matcher 1212 may match digitized video frames in the synchronized video data stream 1208 to metadata data units in the synchronized metadata data stream 1210 based at least in part on the synchronization data 434, 446 associated with the digitized video frames and the metadata data units. The synchronization data 434, 446 may include matching timestamps and/or frame numbers. Digitized video frames and metadata data units with same timestamps may be matched. Digitized video frames and metadata data units with same frame numbers may be matched. Digitized video frames and/or metadata data units without matching timestamps and/or frame numbers may be buffered and/or discarded.

The timestamp matcher 1212 may generate matched data streams 1214 and 1216. For example, the data stream 1214 may be a transformation and/or modification of the synchronized video data stream 1208 in which each digitized video frame is matched to a data unit of the data stream 1216, and the data stream 1216 may be a transformation and/or modification of the synchronized metadata data stream 1210 in which each metadata data unit is matched to a data unit of the data stream 1214. The data stream 1214 may be transmitted to a digitized video interpreter 1218. The data stream 1216 may be transmitted to a metadata interpreter 1220.

The digitized video interpreter 1218 may transform the data stream 1214 into a form 1222 suitable for presentation. The metadata interpreter 1220 may transform the data stream 1216 into a form 1224 suitable for presentation. The forms 1222, 1224 may be tailored for and/or transmitted to an integrated viewer 1226. The integrated viewer 1226 may present the forms 1222, 1224 for simultaneous and/or synchronized viewing.

Having described details of components in accordance with an embodiment of the invention in some detail, the description now turns to procedures and steps that may be performed by such components.

Figure 13:
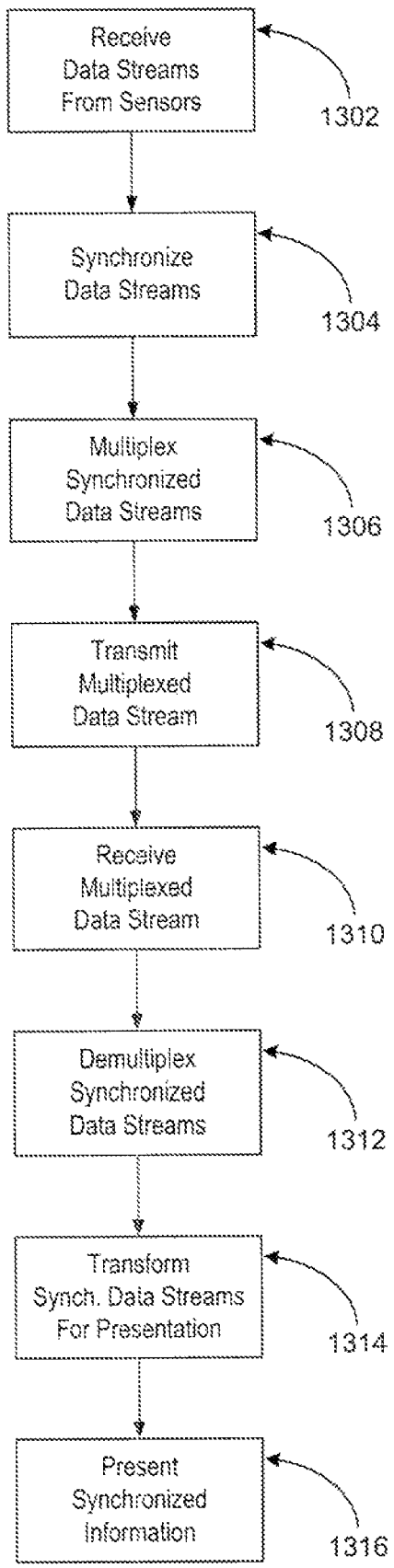
FIG. 13 is a flowchart depicting example steps for synchronizing data streams in accordance with an embodiment of the invention.

FIG. 13 depicts example steps for synchronizing data streams in accordance with an embodiment of the invention. At step 1302, a plurality of data streams may be received from a plurality of sensors. For example, the data collection device(s) 104 of FIG. 1 may include the sensors, and the data stream synchronizer 110 may receive the associated data streams 106, 108 from data collection device(s) 104.

At step 1304, the data streams may be synchronized, for example, by the data stream synchronizer 110 of FIG. 1. At step 1306, the synchronized data streams may be multiplexed, for example, by the data stream synchronizer 110. At step 1308, the multiplexed data streams may be transmitted. For example, the data stream synchronizer 110 may transmit the multiplexed data streams across the communication network 102.

At step 1310, the multiplexed data streams may be received, for example, by the data stream demultiplexer 118 of FIG. 1. At step 1312, the multiplexed data streams may be demultiplexed, for example, by the data stream demultiplexer 118. At step 1314, the demultiplexed and synchronized data streams may be transformed for presentation, for example, by the data presentation device(s) 124. At step 1316, synchronized information may be presented. For example, the data presentation device(s) 124 may present synchronized information generated by step 1314.

Figure 14:
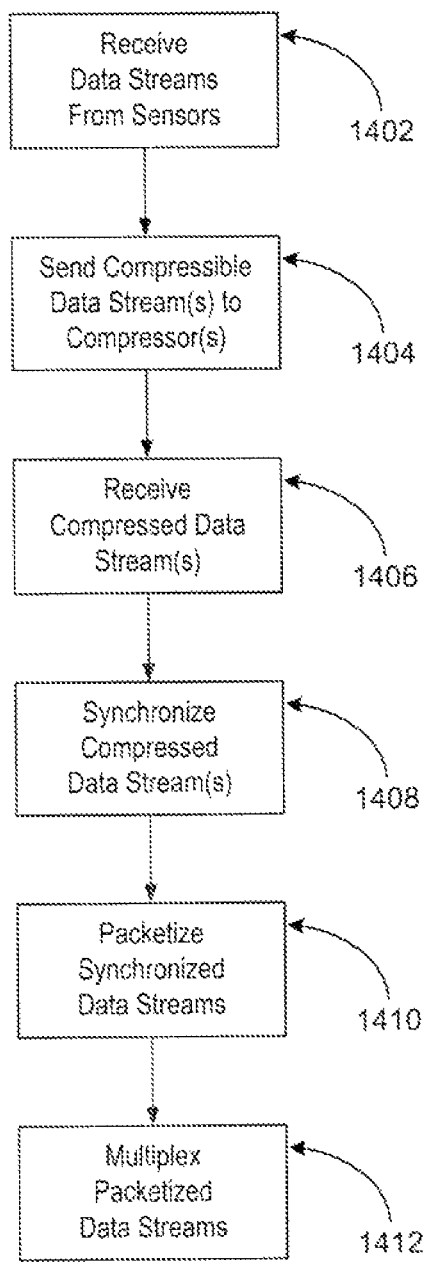
FIG. 14 is a flowchart depicting example steps for synchronizing data streams that include one or more compressed data streams in accordance with an embodiment of the invention.

FIG. 14 depicts example steps for synchronizing data streams that include one or more compressed data streams in accordance with an embodiment of the invention. At step 1402, a plurality of data streams may be received from a plurality of sensors. For example, the synchronization data generator 302 of FIG. 3 may receive data streams 304, 306 originating from sensors in the data collection device(s) 104 of FIG. 1.

At step 1404, one or more compressible data streams may be sent to one or more data stream compressors. For example, the synchronization data generator 302 of FIG. 3 may send one or more of the data streams 304, 306 to one or more of the data stream compressors 308, 312. At step 1406, one or more compressed data streams may be received. For example, the synchronization data generator 302 may receive one or more of the compressed data streams 310, 314 corresponding to the data streams 304, 306 from one or more of the data stream compressors 308, 312.

At step 1408, the one or more compressed data streams may be synchronized. For example, the synchronization data generator 302 (FIG. 3) may generate synchronization data 316, 322 for a plurality of data streams including the one or more compressed data streams received at step 1406. At step 1410, the synchronized data streams may be packetized, for example, by the packetizers 318, 324 of the data stream synchronizer 300. At step 1412, the packetized data streams may be multiplexed, for example, by the packet stream multiplexer 328.

Figure 15:
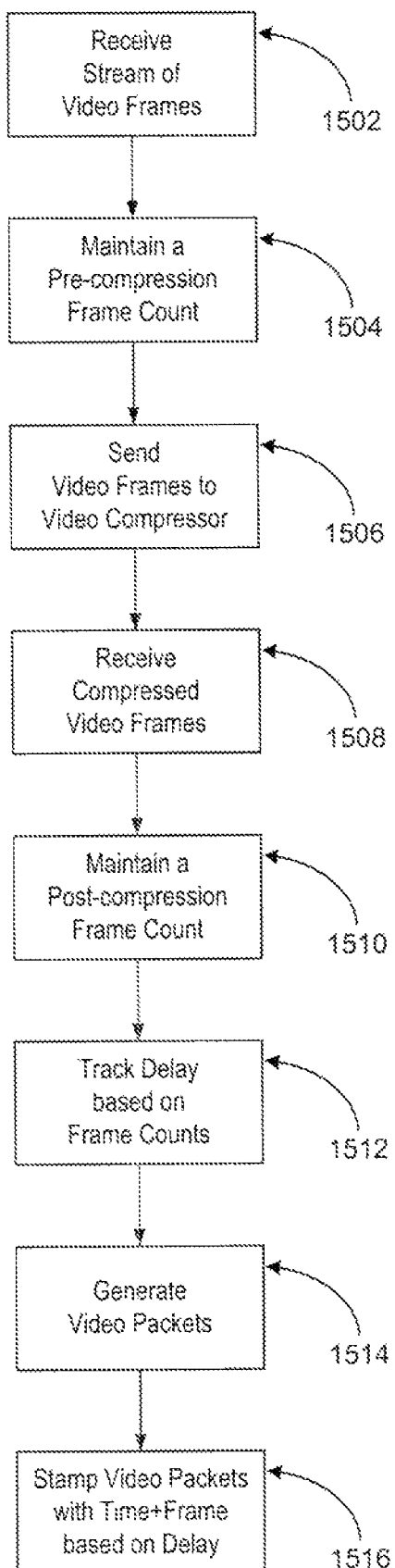
FIG. 15 is a flowchart depicting example steps for synchronizing data streams that include a digitized video stream in accordance with an embodiment of the invention.

FIG. 15 depicts example steps for synchronizing data streams that include a digitized video stream in accordance with an embodiment of the invention. At step 1502, a stream of video frames may be received. For example, the transcompression tracker 410 of FIG. 4 may receive the digitized video data stream 408.

At step 1504, a pre-compression frame count may be maintained. For example, the pre-compression frame counter 606 of FIG. 6 may maintain a count of the digitized video frames in the digitized video data stream 408 of FIG. 4. At step 1506, the video frames in the stream may be sent to a video compressor. For example, the digitized video data stream 408 may be sent to the video compressor 412 by the transcompression tracker 410. At step 1508, compressed video frames may be received. For example, the transcompression tracker 410 may received the compressed digitized video data stream 414 from the video compressor 412.

At step 1510, a post-compression frame count may be maintained. For example, the post-compression frame counter 610 of FIG. 6 may maintain a count of the compressed frames of digitized video in the compressed digitized video data stream 414 of FIG. 4. At step 1512, transcompression delay may be tracked based at least in part on the frame counts maintained at steps 1504 and 1510. For example, the transcompression delay may be tracked by the transcompression delay tracker 616 as described above with reference to FIG. 6.

At step 1514, video packets may be generated, for example, by the video packet generator 432 of FIG. 4. At step 1516, the video packets may be stamped with a time and frame stamp based at least in part on the delay tracked at step 1512. For example, the video packet generator 432 may stamp the video packets generated at step 1513 with time and frame stamps in the synchronization data 434.

Figure 16:
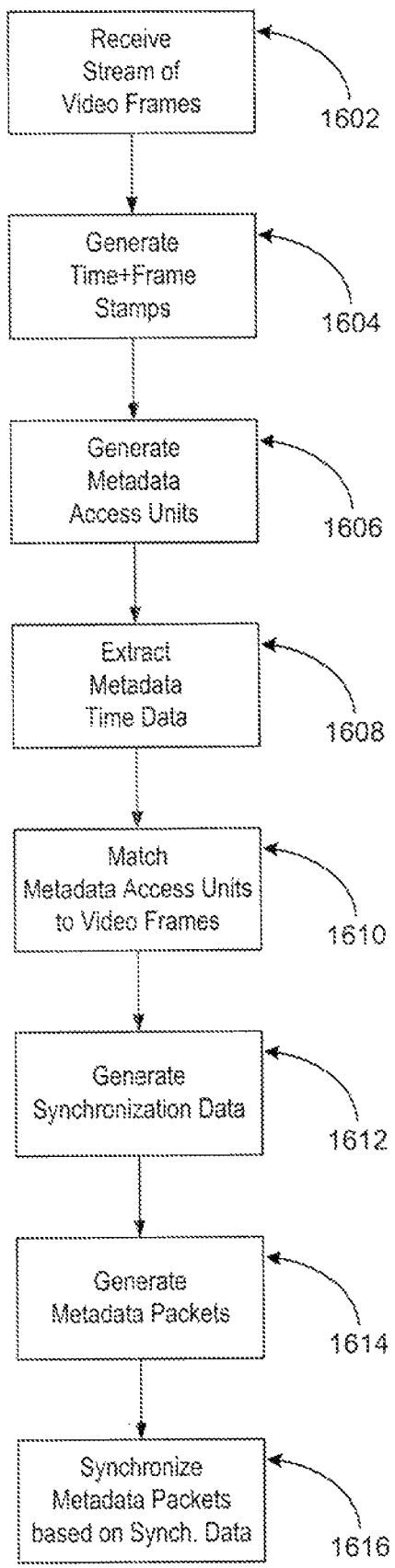
FIG. 16 is a flowchart depicting example steps for synchronizing data streams that include a digitized video stream and a stream of metadata in accordance with an embodiment of the invention.

FIG. 16 depicts example steps for synchronizing data streams that include a digitized video stream and a stream of metadata in accordance with an embodiment of the invention. At step 1602, a stream of video frames may be received. For example, the transcompression tracker 410 of FIG. 4 may receive the digitized video data stream 408. At step 1604, time and frame stamps may be generated, for example, by the time and frame stamp generate 416.

At step 1606, metadata access units may be generated, for example, by the metadata access unit generator 438 of FIG. 4. At step 1608, metadata time data may be extracted, for example, the metadata access unit generator 438 may extract metadata time data 440 from the metadata data stream 420. At step 1610, metadata access units may be matched to video frames. For example, the closest time matcher 422 may match video frames to metadata access units based at least in part on the time and frame stamps generated at step 1604 and the metadata time data extracted at step 1608.

At step 1612, synchronization data may be generated, for example, by the closest time matcher based at least in part on the matching of step 1610. At step 1614, metadata packets may be generated, for example, by the metadata packet generator 444 of FIG. 4. At step 1616, the metadata packets may be synchronized based at least in part on the synchronization data generated at step 1612.

Figure 17:
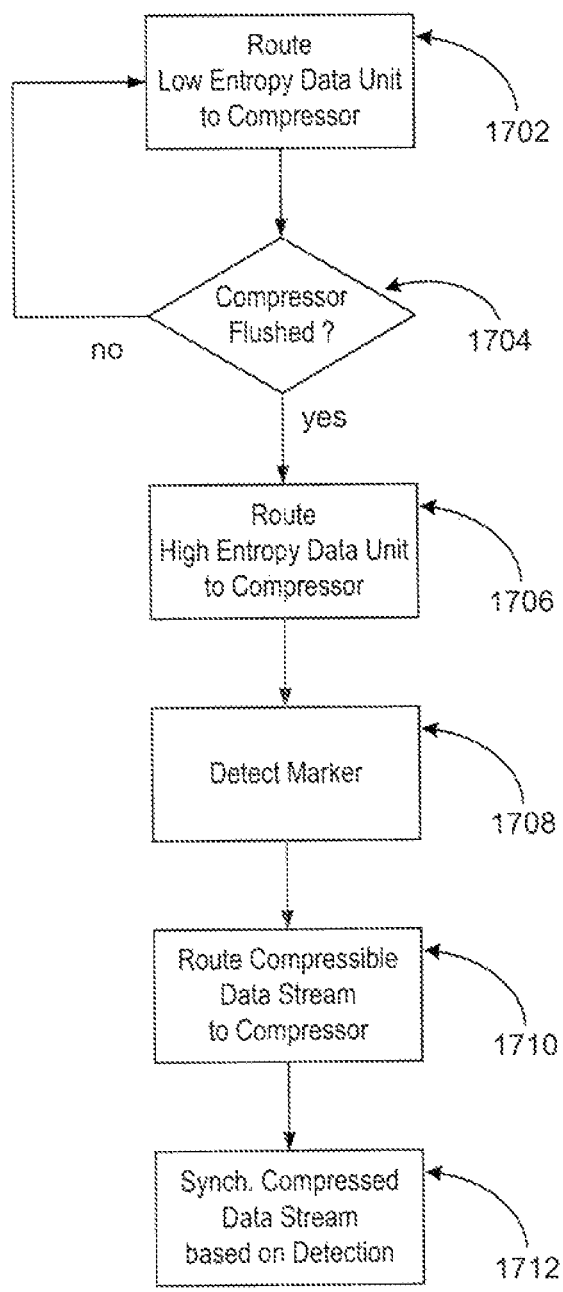
FIG. 17 is a flowchart depicting example steps for synchronizing a compressed data stream in accordance with an embodiment of the invention.

FIG. 17 depicts example steps for synchronizing a compressed data stream in accordance with an embodiment of the invention. At step 1702, low entropy data units may be routed to a data stream compressor. For example, the data stream multiplexer 704 of FIG. 7 may route low entropy data units 710 to the data stream compressor 716. At step 1704, it may be determined if the data stream compressor has been flushed and/or reset. For example, the marker detector 736 may make the determination based at least in part upon sizes of compressed data units corresponding to the low entropy data units routed to the data stream compressor at step 1702. If it is so determined, a procedure incorporating step 1704 may progress to step 1706. Otherwise, the procedure may return to step 1702. Alternatively, steps 1702 and 1704 may be replaced by a step (not shown in FIG. 17) of routing a specified number of low entropy data units to the data stream compressor 716. For example, the specified number may be a flushing and/or reset number of low entropy data units capable of flushing and/or resetting the data stream compressor 716 (e.g., putting an internal state of the data stream compressor 716 into a predictable and/or initial state). Furthermore, some data stream compressors such as the data stream compressor 716 include an explicit flush and/or reset facility (e.g., a software and/or hardware interface). In such a case, steps 1702 and 1704 may be replaced by another alternate step (not shown in FIG. 17) of utilizing the explicit flush and/or reset facility.

At step 1706, a high entropy data unit may be routed to the data stream compressor. For example, the data stream multiplexer 704 of FIG. 7 may route high entropy data units 714 to the data stream compressor 716. At step 1708, a marker may be detected. For example, the marker detector 736 may detect the marker based at least in part on the size of the compressed data unit corresponding to the high entropy data unit routed to the data stream compressor at step 1706.

At step 1710, a compressible data stream may be routed to the data stream compressor. For example, the data stream multiplexer 704 may route the compressible data stream 702 to the data stream compressor 716. At step 1712, a compressed data stream may be synchronized based at least in part on the detection of step 1708. For example, the synchronization data generator 302 of FIG. 3 may generate synchronization data 316 based at least in part on the detection of step 1708, and the compressed data stream 310 may be synchronized by the data stream synchronizer 300 based at least in part on the synchronization data 316.

Figure 18:
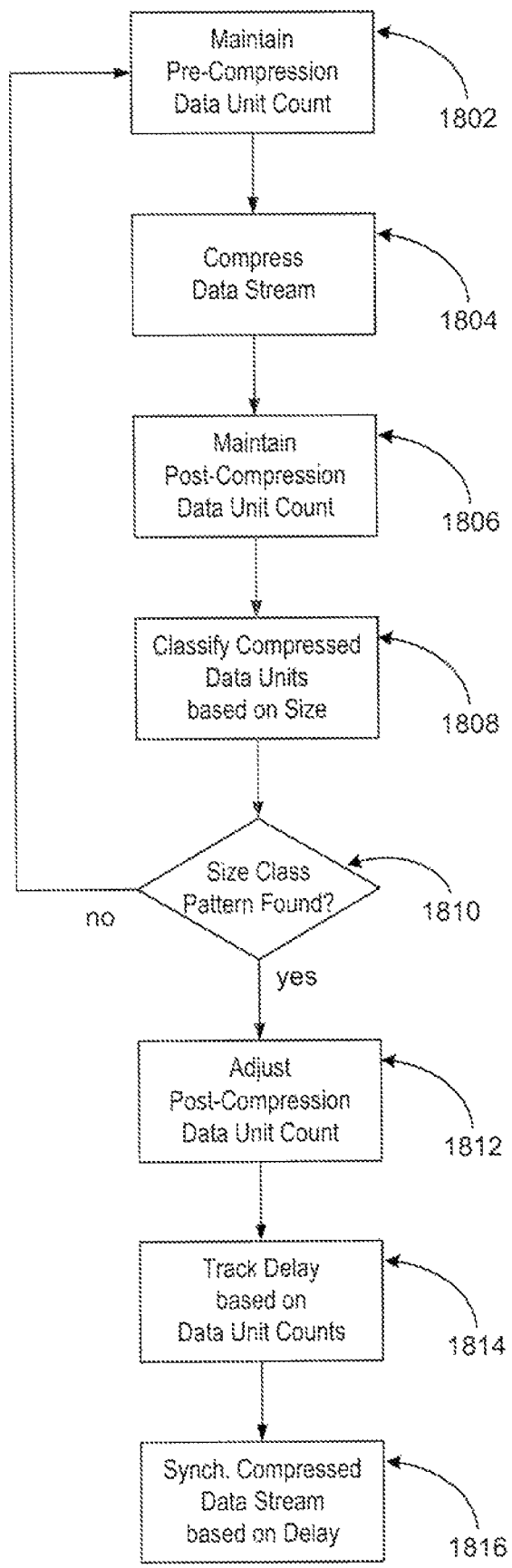
FIG. 18 is a flowchart depicting further example steps for synchronizing a compressed data stream in accordance with an embodiment of the invention.

FIG. 18 depicts further example steps for synchronizing a compressed data stream in accordance with an embodiment of the invention. At step 1802, a pre-compression data unit count may be maintained. For example, by the pre-compression data unit counter 720 of FIG. 7 may maintain a count of the data units in the compressible data stream 702.

At step 1804, a data stream may be compressed. For example, the data stream compressor 716 of FIG. 7 may compress the compressible data stream 702. At step 1806, a post-compression data unit count may be maintained. For example, the post-compression data unit counter 722 may maintain a count of compressed data units in the compressed data stream 734 generated by the data stream compressor 716 corresponding to the compressible data stream 702.

At step 1808, compressed data units may be classified based at least in part on size. For example, the marker detector 736 may classify sizes of compressed data units in the compressed data stream 734. At step 1810, it may be determined if a size class pattern has been found. For example, the marker detector 736 may make the determination based at least in part on the classifications of step 1808. If it is so determined, a procedure incorporating step 1810 may progress to step 1812. Otherwise, the procedure may return to step 1802.

At step 1812, the post-compression data unit count may be adjusted. For example, the control logic component 706 may adjust the post-compression data unit counter 722 as described above with reference to FIG. 7. At step 1814, transcompression delay may be tracked based at least in part on the data unit counts maintained at steps 1806 and 1812. At step 1816, the data stream compressed at step 1804 may be synchronized based at least in part on the transcompression delay tracked at step 1814, for example, by the data stream synchronizer 300 of FIG. 3.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

What is claimed is:

1. A method of synchronizing a plurality of data streams including an uncompressed data stream and a supplementary data stream comprising:
   causing a data stream compressor to output a compressed data stream based at least in part on the uncompressed data stream;
   causing the data stream compressor to output a distinguished data unit in the compressed data stream at least in part by modifying the uncompressed data stream with a transcompression tracker prior to compression;
   detecting the distinguished data unit in the compressed data stream with the transcompression tracker; and
   synchronizing the compressed data stream and the supplementary data stream based at least in part on the detection,
   wherein the transcompression tracker comprises a pre-compression data unit counter maintaining a first count and a post-compression data unit counter maintaining a second count, and the transcompression tracker generates synchronization information based at least in part on the first count and the second count.

2. The method of claim 1, wherein modifying the uncompressed data stream comprises overwriting at least one data unit in the uncompressed data stream.

3. The method of claim 2, wherein the at least one data unit is overwritten with at least one low entropy data unit, and at least one high entropy data unit.

4. The method of claim 3, wherein:
   the uncompressed data stream comprises a plurality of digitized video frames;
   the at least one low entropy data unit comprises a low entropy digitized video frame; and
   the at least one high entropy data unit comprises a high entropy digitized video frame.

5. The method of claim 1, wherein:
   the compressed data stream comprises a plurality of compressed data units including at least one compressed data unit based on the uncompressed data stream and the distinguished data unit; and
   detecting the distinguished data unit comprises distinguishing the distinguished data unit from the at least one compressed data unit based on the uncompressed data stream.

6. The method of claim 5, wherein:
   each of the plurality of compressed data units has a size; and
   distinguishing the distinguished data unit from the at least one compressed data unit based on the uncompressed data stream comprises distinguishing the distinguished data unit based at least in part on the size of the distinguished data unit.

7. The method of claim 6, wherein:
   sizes of data units are classified into a plurality of size classes; and
   distinguishing the distinguished data unit comprises detecting a pattern of size classes among the sizes of the plurality of compressed data units.

8. The method of claim 7, wherein:
   the plurality of size classes includes a small class and a large class; and
   the pattern of size classes includes at least one of the small class and at least one of the large class.

9. The method of claim 8, wherein the pattern of size classes comprises a sequence of size classes including a sequence of the at least one of the small class followed by the at least one of the large class.

10. The method of claim 9, wherein:
    at least one of the plurality of compressed data units having a size in the small class corresponds to at least one low entropy data unit in the uncompressed data stream; and
    at least one of the plurality of compressed data units having a size in the large class corresponds to at least one high entropy data unit in the uncompressed data stream.

11. A system comprising a receiving module configured to, at least, receive the plurality of data streams synchronized with the method of claim 1.

12. At least one tangible non-transitory computer-readable medium having thereon computer-executable instructions that configure a computerized system to, at least, perform the method of claim 1.

13. The method of claim 1, wherein transcompression tracker adjusts the first count or the second count based at least in part on the detection of the distinguished data unit in the compressed data stream.

14. The method of claim 1, further comprising, responsive to the detection of the distinguished data unit in the compressed data stream, filtering out the distinguished data unit from the compressed data stream.

15. A system for synchronizing a plurality of data streams including an uncompressed data stream and a supplementary data stream, the system comprising:
    a data stream compressor configured to, at least, compress the uncompressed data stream to generate a compressed data stream; and
    a data stream synchronizer configured to, at least:
       cause the data stream compressor to output a distinguished data unit in the compressed data stream at least in part by modifying the uncompressed data stream with a transcompression tracker prior to compression;
       detect the distinguished data unit in the compressed data stream with the transcompression tracker; and
       synchronize the compressed data stream and the supplementary data stream based at least in part on the detection,
    wherein the transcompression tracker comprises a pre-compression data unit counter maintaining a first count and a post-compression data unit counter maintaining a second count, and the transcompression tracker generates synchronization information based at least in part on the first count and the second count.

16. A user interface that, at least, configures the system of claim 15.

17. A system for synchronizing a plurality of data streams including an uncompressed data stream, the system comprising:
    a data stream compressor;
    a data stream multiplexer;
    a control logic component configured to, at least:
       cause the data stream multiplexer to route the uncompressed data stream to the data stream compressor; and
       cause the data stream multiplexer to route a high entropy data unit to the data stream compressor thereby modifying the uncompressed data stream received by the data stream compressor; and
    a marker detector configured at least to detect a distinguished output in a compressed data stream from the data stream compressor, the distinguished output in the compressed data stream corresponding to a sequence of uncompressed data units received by the data stream compressor including the high entropy data unit.

18. A method of synchronizing a plurality of data streams including an uncompressed data stream and a supplementary data stream comprising:
- causing a data stream compressor to output a compressed data stream based at least in part on the uncompressed data stream;
- causing the data stream compressor to output a marker pattern of data units including a distinguished data unit in the compressed data stream at least in part by modifying the uncompressed data stream prior to compression; and
- detecting the marker pattern of data units in the compressed data stream; and
- synchronizing the compressed data stream and the supplementary data stream based at least in part on the detection.

* * * * *